United States Patent
Porter

(10) Patent No.: US 12,514,599 B2
(45) Date of Patent: Jan. 6, 2026

(54) MECHANICALLY RESONANT PULSE RELIEF VALVE FOR ASSISTED CLEARING OF PLUGGED ASPIRATION

(71) Applicants: STRYKER CORPORATION, Kalamazoo, MI (US); STRYKER EUROPEAN OPERATIONS LIMITED, Carrigtwohill (IE)

(72) Inventor: Stephen Porter, Piedmont, CA (US)

(73) Assignees: Stryker Corporation, Kalamazoo, MI (US); Stryker European Operations Limited, Carrigtwohill (IE)

(*) Notice: Subject to any disclaimer, the term of this patent is extended or adjusted under 35 U.S.C. 154(b) by 1197 days.

(21) Appl. No.: 17/387,949

(22) Filed: Jul. 28, 2021

(65) Prior Publication Data
US 2021/0353314 A1 Nov. 18, 2021

Related U.S. Application Data

(63) Continuation-in-part of application No. 17/133,684, filed on Dec. 24, 2020, now Pat. No. 11,730,498.
(Continued)

(51) Int. Cl.
A61B 17/22 (2006.01)
A61M 1/00 (2006.01)
A61M 25/00 (2006.01)

(52) U.S. Cl.
CPC .......... *A61B 17/22* (2013.01); *A61M 1/743* (2021.05); *A61B 2017/22079* (2013.01); *A61B 2217/005* (2013.01); *A61M 2025/0019* (2013.01)

(58) Field of Classification Search
CPC .......... A61B 17/22; A61B 2017/22079; A61B 2217/005; A61B 2090/064;
(Continued)

(56) References Cited

U.S. PATENT DOCUMENTS 4,315,506 A * 2/1982 Kayser .................. A61M 1/75
604/35
4,447,226 A 5/1984 Mayoral
(Continued)

FOREIGN PATENT DOCUMENTS

WO WO 2014/151209 9/2014
WO WO-2014151209 A1 * 9/2014 ............. A61M 1/75
WO WO 2021/150348 7/2021

OTHER PUBLICATIONS

Foreign Exam Report for EP Patent Appln. No. 20842903.5 dated Apr. 2, 2024.
(Continued)

*Primary Examiner* — Nicholas J. Weiss
*Assistant Examiner* — Brandon W. Levy
(74) *Attorney, Agent, or Firm* — Vista IP Law Group, LLP

(57) ABSTRACT

An aspiration system comprises an aspiration catheter, an aspiration source fluidly coupled to the aspiration catheter to create an aspiration flow path between the aspiration catheter and the aspiration source, a pressurized fluid source, and a passive pressure oscillation assembly fluidly coupled between the pressurized fluid source and the aspiration flow path. The passive pressure oscillation assembly is configured for being operated between a normal mode that prevents fluid communication between the pressurized fluid source and the aspiration flow path, and an oscillatory mode that pulses fluid communication between the pressurized fluid source and the aspiration flow path. The passive pressure oscillation assembly is configured for being triggered to switch from the normal mode to the oscillatory mode in response to a clog in the aspiration catheter.

26 Claims, 16 Drawing Sheets

Related U.S. Application Data

(60) Provisional application No. 62/965,115, filed on Jan. 23, 2020.

(58) Field of Classification Search
CPC .... A61B 2217/007; A61B 2017/00154; A61B 17/32; A61M 1/743; A61M 2025/0019; A61M 1/75; A61M 1/74; A61M 1/742; A61M 1/79; A61M 1/84
See application file for complete search history.

(56) References Cited

U.S. PATENT DOCUMENTS

| | | | |
|---|---|---|---|
| 6,228,056 B1* | 5/2001 | Boehringer | A61M 1/75 604/118 |
| 10,531,883 B1 | 1/2020 | Deville et al. | |
| 2017/0136209 A1* | 5/2017 | Burnett | A61M 1/60 |
| 2019/0239910 A1 | 8/2019 | Brady et al. | |
| 2020/0022712 A1* | 1/2020 | Deville | A61M 25/0075 |

OTHER PUBLICATIONS

Non-Final Office Action for U.S. Appl. No. 17/133,684 dated Jan. 27, 2023.

International Search Report and Written Opinion for International Appln. No. PCT/US2022/038643, Applicant Stryker Corporation, dated Nov. 16, 2022 (14 pages).

Foreign Notice of Rejection for JP Patent Appln. No. 2022-545070 dated Sep. 2, 2024 (with English translation).

Foreign Office Action and Search Report for CN Patent Appln. No. 202080098910.1 dated Jun. 22, 2025 (with selected English translation of examiner comments).

* cited by examiner

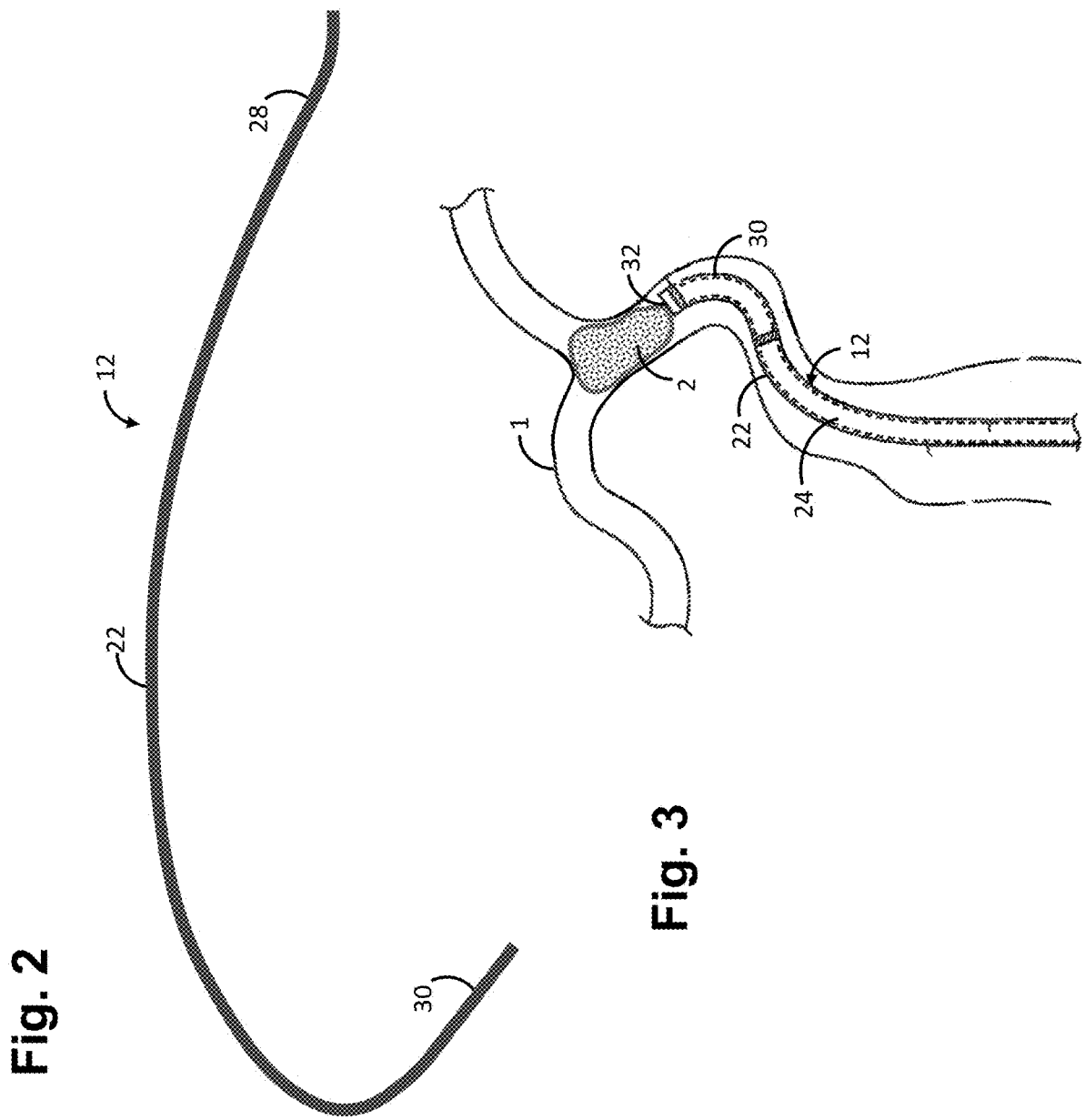

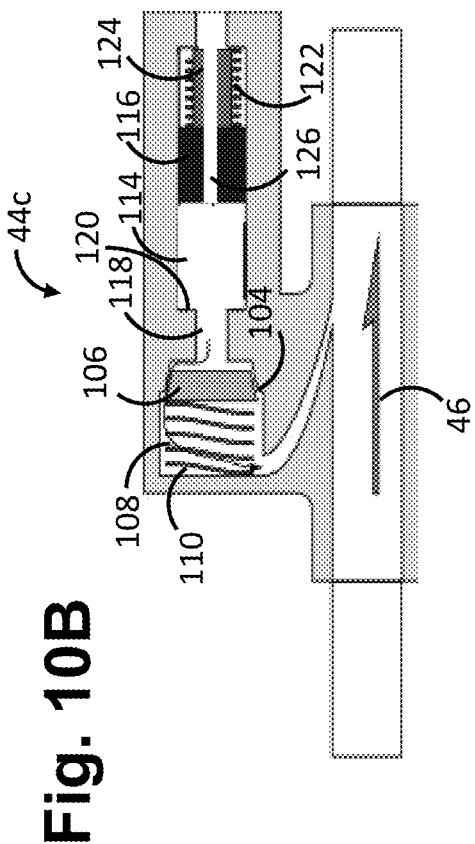
Fig. 10A
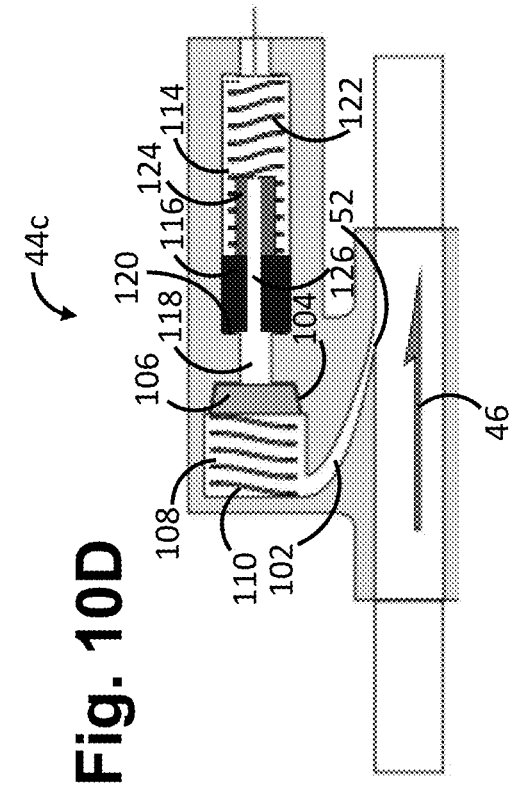
Fig. 10B
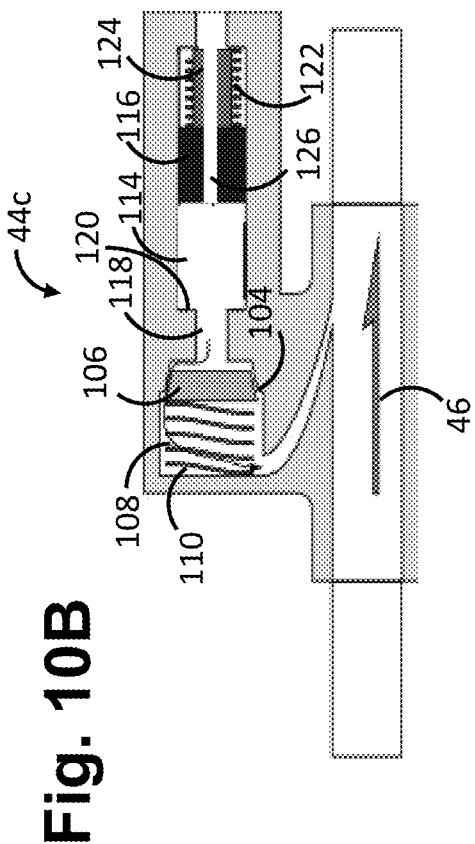
Fig. 10C
Fig. 10D

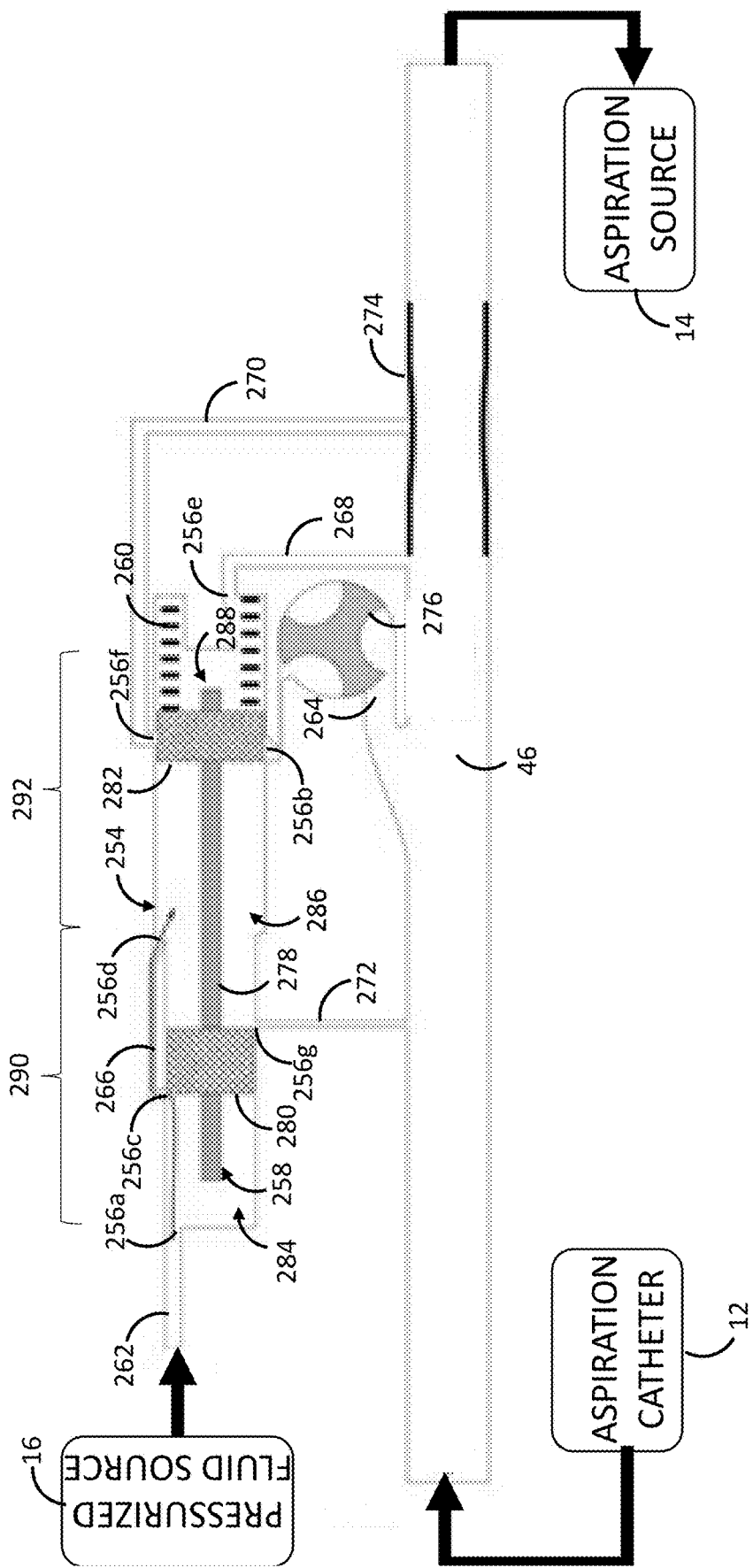

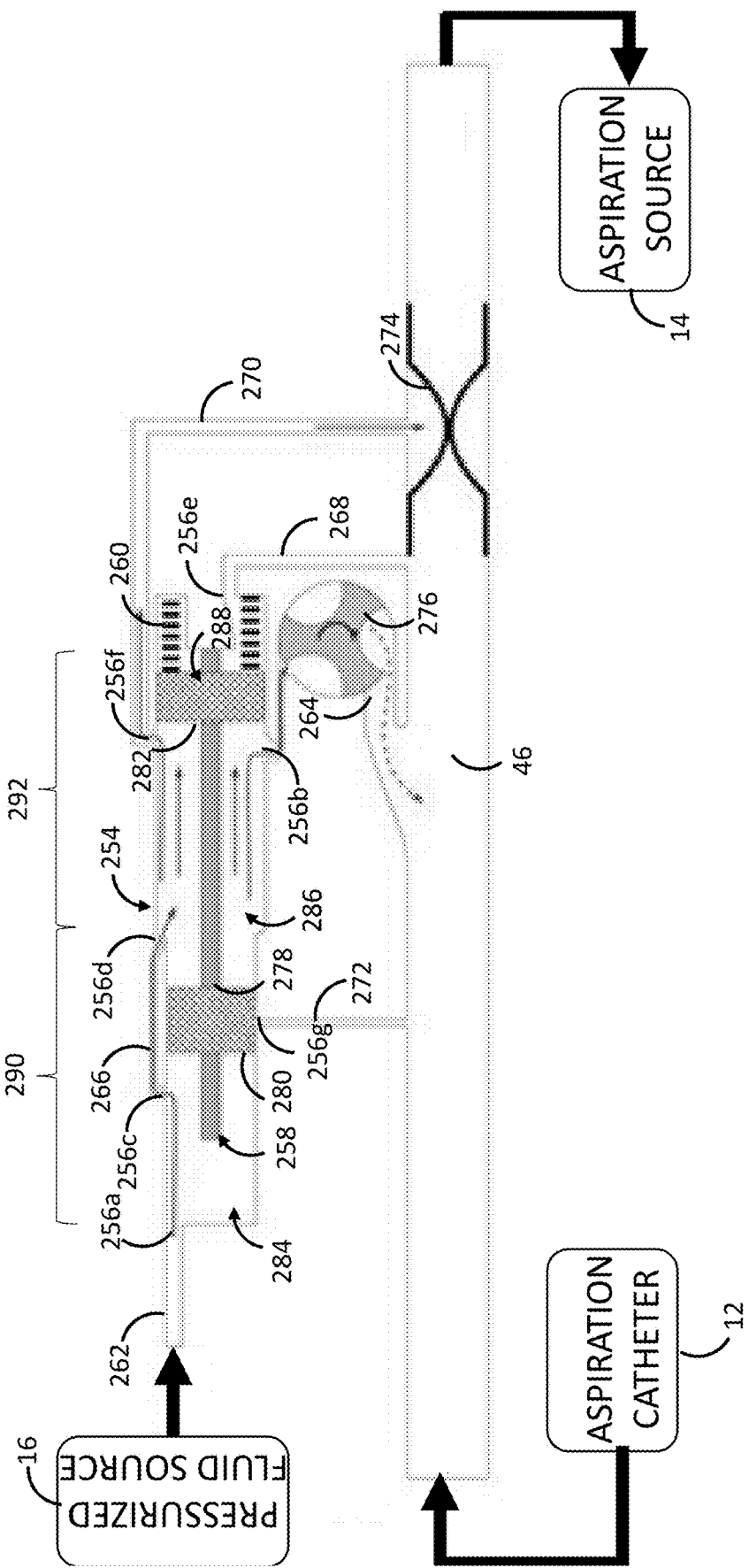

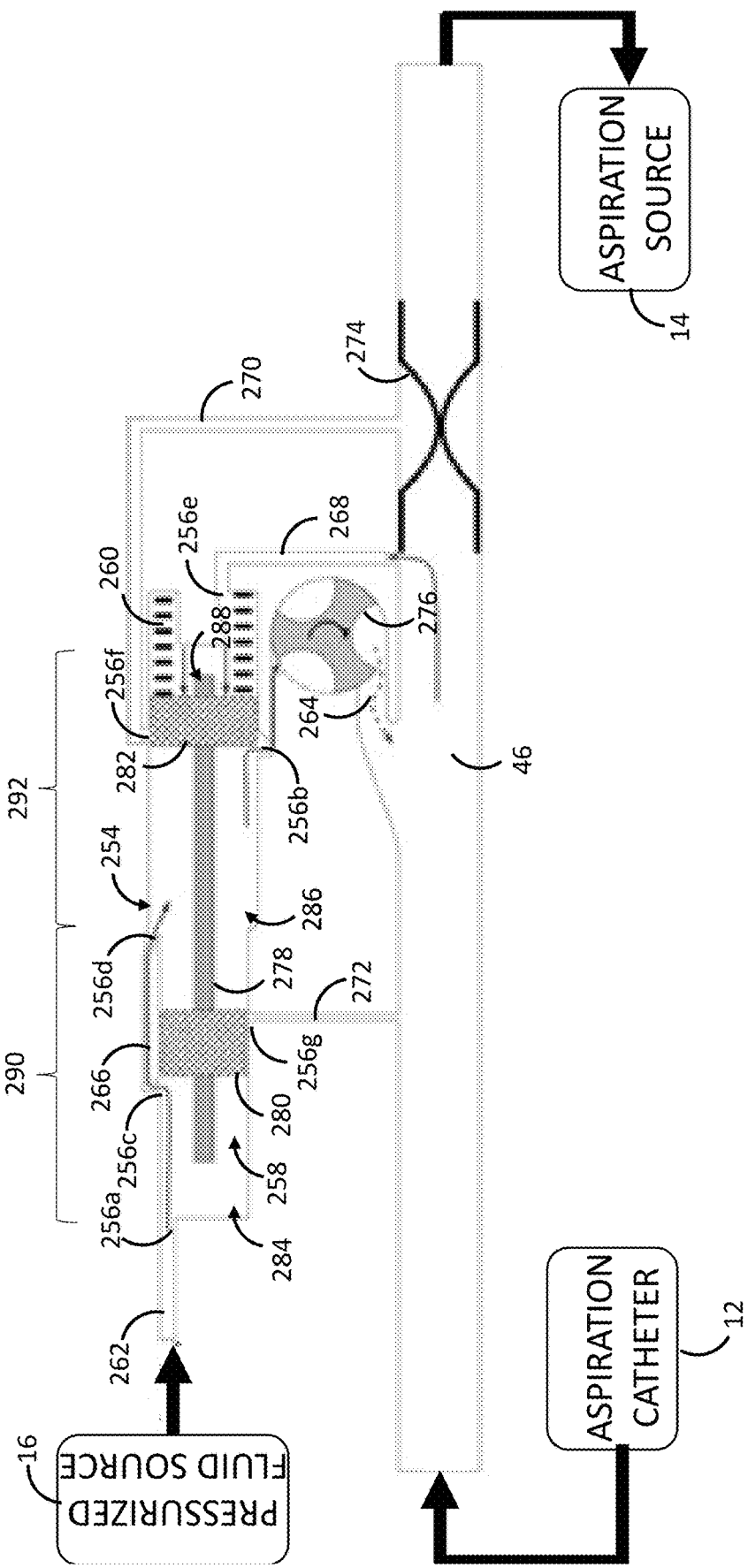

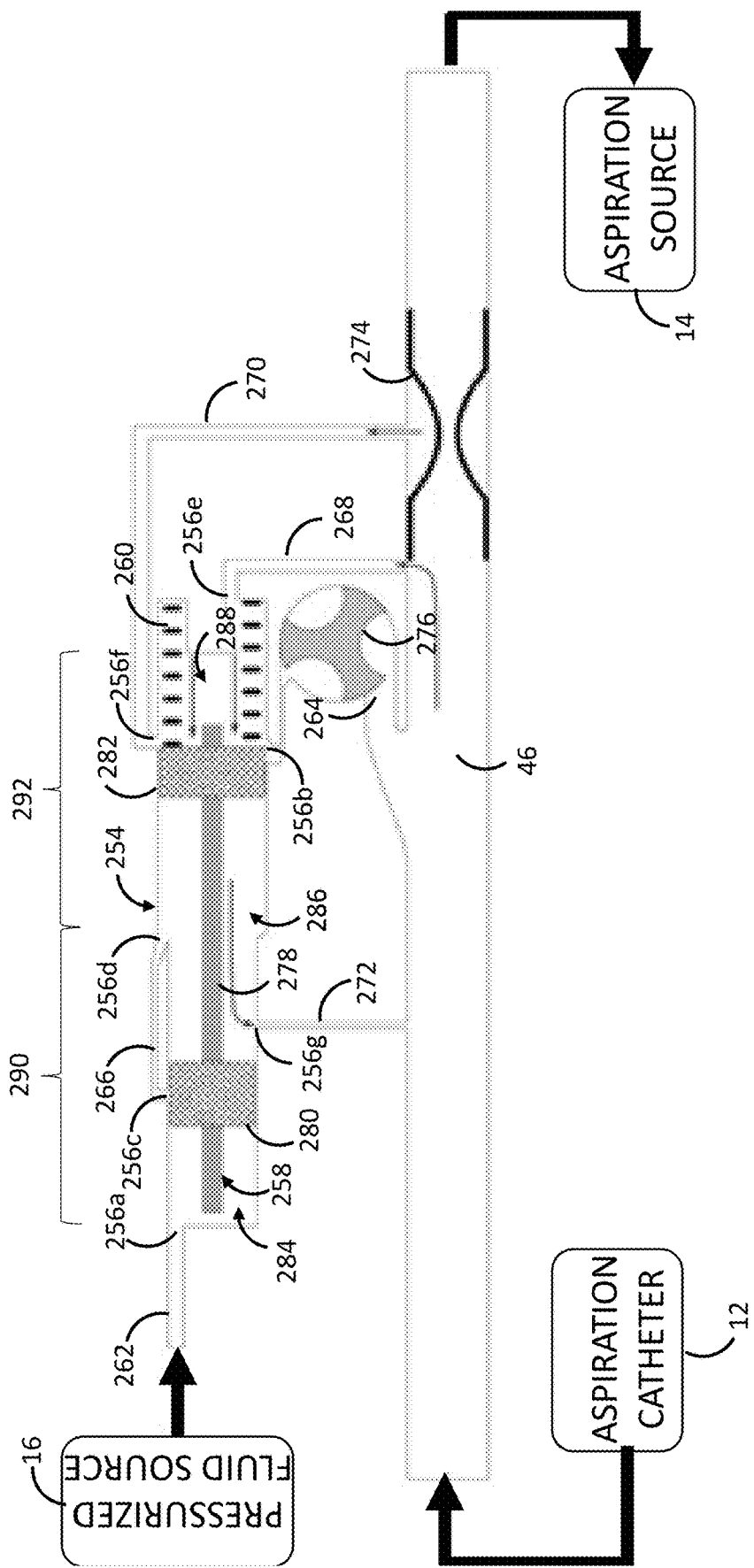

MECHANICALLY RESONANT PULSE RELIEF VALVE FOR ASSISTED CLEARING OF PLUGGED ASPIRATION

RELATED APPLICATION DATA

This patent application is a continuation-in-part of U.S. patent application Ser. No. 17/133,684, filed Dec. 24, 2020, which claims priority to U.S. Provisional Application Ser. No. 62/965,115, filed Jan. 23, 2020. Each of these patent applications is incorporated by reference in its entirety herein.

FIELD OF THE INVENTION

The present disclosure relates generally to medical devices and intravascular medical procedures and, more particularly, to devices and methods for aspirating objects from the anatomy, e.g., a clot from the vasculature of the patient.

BACKGROUND OF THE INVENTION

It is often desirable to remove tissue from the body in a minimally invasive manner as possible, so as not to damage other tissues. For example, removal of tissue from within a vasculature, such as blood clots, may improve patient conditions and quality of life.

Many vascular system problems stem from insufficient blood flow through blood vessels. One cause of insufficient or irregular blood flow is a blockage within a blood vessel referred to as a blood clot or thrombus. Blood clots or thrombi may embolize and form an embolus in a patient vasculature. Thrombi can occur for many reasons, including damage to the arterial wall from atherosclerotic disease, trauma caused by surgery, or due to other causes.

When a thrombus forms, it may effectively stop the flow of blood through the zone of formation. Sometimes such thrombi are harmlessly dissolved in the blood stream. At other times, however, such thrombi may lodge in a blood vessel where they can partially or completely occlude the flow of blood. If the partially or completely occluded vessel feeds blood to sensitive tissue such as, the brain, lungs or heart, for example, serious tissue damage may result. For example, thrombosis of one of the carotid arteries can lead to stroke, because of insufficient oxygen supply to vital nerve centers in the cranium. As another example, if one of the coronary arteries is 100% thrombosed, the flow of blood is stopped in that artery, resulting in a shortage of oxygen carrying red blood cells, e.g., to supply the muscle (myocardium) of the heart wall. Oxygen deficiency reduces or prohibits muscular activity, can cause chest pain (angina pectoris), and can lead to death of myocardium, which permanently disables the heart to some extent. If the myocardial cell death is extensive, the heart will be unable to pump sufficient blood to supply the body's life sustaining needs. Indeed, a large percentage of the more than 1.2 million heart attacks in the United States are caused by blood clots (thrombi) which form within a coronary artery.

When symptoms of an occlusion are apparent, such as an occlusion resulting in a stroke, immediate action should be taken to reduce or eliminate resultant tissue damage. Indeed, clinical data indicates that clot removal may be beneficial or even necessary to improve outcomes. For example, in the peripheral vasculature, clot removal can reduce the need for an amputation by 80 percent. The ultimate goal of any modality to treat these conditions of the arterial or venous system is to remove the blockage or restore patency, quickly, safely, and cost effectively. One approach is to treat a patient with clot dissolving drugs. These drugs, however, do not immediately dissolve the clot from the patient, and are typically ineffective after a predefined window, usually at 2-3 hours after the symptoms arise from the clot. Other approaches involve thrombectomy, i.e., the removal of the clot by aspiration, mechanical retrieval, or a combination thereof. Mechanical retrieval usually involves a deployable mesh-like grid, such as a stent retriever, and is often complicated and dangerous to perform.

Aspiration thrombectomy is generally an effective and common treatment for removing a clot from a blood vessel, especially in the case of ischemic stroke. In a typical endovascular aspiration thrombectomy procedure, a catheter is introduced into the vasculature of the patient until the distal end of a catheter is just proximal to the clot, and a vacuum is applied at the proximal end of the catheter, resulting in the ingestion and subsequent removal of at least a portion of the clot into the catheter. Most aspiration systems are susceptible to tip clogging when the clot that is being aspirated is too large for the aspiration conduit at the distal end of the catheter. Current technology for endovascular thrombectomy in ischemic stroke utilizes static loading. Once tip clogging occurs, the pressure in the system precipitously drops to a level that often results in boiling or cavitation of the aspirate within the system. As a result, water vapor is introduced into the system, thereby decreasing the efficiency of the aspiration, and in turn, making it more difficult, if not impossible, to ingest the clot into the catheter.

In some cases, the clog can be disrupted or forced to squeeze through the aspiration conduit by dynamically or cyclically loading the aspiration conduit, which involves using pressure pulsing to ingest the clogged clot. One method of cyclically loading the aspiration conduit uses a cyclically activated valve or similar configuration to achieve the pressure pulsing by blocking main stream flow. Typically, this is done by hand, or via an electro-mechanical or pneumatic valve which blocks aspirate flow to the pump for a specified time interval. In some instances, pressure sensing feedback has been suggested as a means for determining when to activate the valve. One cyclical loading method, described in Simon S, Grey C P, Massenzo T, et al., "Exploring the efficacy of cyclic vs static aspiration in a cerebral thrombectomy model: an initial proof of concept study," Journal of NeuroInterventional Surgery 2014; 6:677-683 and PCT Publication WO2014151209A8, employs a venting mechanism that is automatically placed in an oscillatory pulse mode in response to the application of vacuum to the aspiration conduit. However, these methods either require user intervention to cyclically load the aspiration conduit in response to the realization that the aspiration conduit it has been clogged, which would distract the user from performing the aspiration procedure at hand, or cyclically load the aspiration conduit immediately upon the application of vacuum to the aspiration conduit, and thus, decreases the efficiency of the aspiration procedure during free flow (i.e., when the aspiration conduit is not clogged).

There, thus, is an ongoing need for a technique that only cyclically loads an aspiration conduit of an aspiration catheter during no-flow or low-flow conditions.

SUMMARY OF THE INVENTION

In accordance with a first aspect of the present inventions, a manifold for use with an aspiration catheter, an aspiration source, and a pressurized fluid source (e.g., ambient air or a reservoir containing liquid) is provided.

The manifold comprises an aspiration outlet configured for being fluidly coupled the aspiration source, an aspiration inlet configured for being fluidly coupled to the aspiration catheter, such that an aspiration flow path is formed between the aspiration catheter and the aspiration source, and a relief inlet configured for being fluidly coupled to the pressurized fluid source.

The manifold further comprises a passive pressure oscillation assembly fluidly coupled between the relief inlet and the aspiration flow path, the passive pressure oscillation assembly configured for being operated between a normal mode that prevents fluid communication between the pressurized fluid source and the aspiration flow path, and an oscillatory mode that pulses fluid communication between the pressurized fluid source and the aspiration flow path (e.g., at a frequency in the range of 0.2 Hz-10 Hz). The passive pressure oscillation assembly is configured for being triggered to switch from the normal mode to the oscillatory mode in response to a clog in the aspiration catheter.

In one embodiment, fluid communication pulsing between the pressurized fluid source and the aspiration flow path causes pressure pulses to propagate in the aspiration flow path. In another embodiment, fluid communication pulsing between the pressurized fluid source and the aspiration flow path causes fluid backflows to propagate in the aspiration flow path. The passive pressure oscillation assembly may be configured for being triggered to switch from the oscillatory mode to the normal mode in response to removal of the clog from the aspiration catheter. In still another embodiment, the oscillatory mode of the passive pressure oscillation assembly pulses fluid communication between the pressurized fluid source and the aspiration flow path concurrently at a first frequency (e.g., in the range of 0.2 Hz-10 Hz) and at second frequency different from the first frequency (e.g., in the range of 100 Hz-400 Hz).

In one embodiment, the passive pressure oscillation assembly comprises a pressure actuated valve configured for opening in response to the clog in the aspiration catheter, thereby allowing a flow of fluid originating from the pressurized fluid source through the pressure actuated valve, and a fluid resonator configured for resonating in response to the flow of fluid originating from the pressurized fluid source through the pressure actuated valve, thereby pulsing the fluid communication between the pressurized fluid source and the aspiration flow path. The pressure actuated valve and fluid resonator may be mechanically coupled to each other or mechanically decoupled from each other. In this embodiment, the fluid resonator may optionally be configured for resonating at a first frequency in response to the flow of fluid originating from the pressurized fluid source through the pressure actuated valve, thereby pulsing the fluid communication between the pressurized fluid source and the aspiration flow path at the first frequency. The pressure actuated valve may further comprise another fluid resonator configured for resonating at a second frequency different from the first frequency in response to the flow of fluid originating from the pressurized fluid source through the pressure actuated valve, thereby pulsing the fluid communication between the pressurized fluid source and the aspiration flow path at the second frequency.

In another embodiment, the passive pressure oscillation assembly comprises a valve seal fluidly coupled to the relief inlet, a movable valve element, and an enlarged flow cavity fluidly coupled to the aspiration flow path. In one specific embodiment, the movable valve element comprises one of a disk and a ball, and the valve seal comprises a valve seat. In another specific embodiment, the movable valve element comprises a disk, and the valve seal comprises a valve cylinder. The enlarged flow cavity has a profile that is larger than a profile of the movable valve element. In this embodiment, the passive pressure oscillation assembly further comprises a spring configured for applying a biasing force to the movable valve element to maintain the movable valve element in a closed position against the valve seal to prevent the flow of the fluid originating from the pressurized fluid source into the enlarged flow cavity. The movable valve element is configured for, in response to the clog in the aspiration catheter that causes the fluid originating from the pressurized fluid source to apply an opposing force to the movable valve element that overcomes the biasing force applied by the spring to the movable valve element, being displaced from the closed position to an open position away from the valve seal and into the enlarged flow cavity to allow the flow of the fluid originating from the pressurized fluid source, through the valve seal, through the enlarged flow cavity, and into the aspiration flow path. The biasing force applied by the spring to the movable valve element, the opposing force applied by the fluid originating from the pressurized fluid source, and the mass of the movable valve element are selected, such that the movable valve element oscillates between the closed position and the open position.

In this embodiment, the passive pressure oscillation assembly may optionally further comprises a plunger cavity disposed between the valve seal and the relief inlet, and a plunger head slidably disposed within the plunger cavity. The plunger head has a channel extending through the plunger head, such that the valve seal is fluidly coupled to the relief inlet to equalize pressure between the pressurized fluid source and the plunger cavity. The passive pressure oscillation assembly further comprises another spring configured for applying a biasing force to the plunger head to maintain the movable valve element away from the stop. The fluid originating from the pressurized fluid source that applies the opposing force to the movable valve element in response to the clog in the aspiration catheter resides within the plunger cavity. The flow of the fluid from the plunger cavity, through the valve seal, through the enlarged flow cavity, and into the aspiration flow path, causes fluid from the pressurized fluid source to apply an opposing force to the plunger that overcomes biasing force applied by the other spring to the plunger, such that the plunger head is displaced within the plunger cavity until the plunger abuts the stopper, thereby preventing flow of the fluid from the plunger cavity, through the valve seal, through the enlarged flow cavity, and into the aspiration flow path, and allowing the biasing force applied by the spring to the movable valve element to displace the movable valve element from the open position back to the closed position. The passive pressure oscillation assembly may further comprise a reduced profile center cavity fluidly coupled between the valve seal and the plunger cavity, in which case, the plunger stop may be formed by a wall of the plunger cavity adjacent the reduced profile center cavity.

In still another embodiment, the passive pressure oscillation assembly comprises a plunger cavity and a plunger assembly slidably disposed within the plunger cavity. The plunger assembly includes a rod, a first plunger head affixed to the rod, and a second plunger head affixed to the rod in a spaced apart relationship with the first plunger head, thereby forming a front plunger cavity region, a center plunger cavity region between the first plunger head and the second plunger head, and a rear plunger cavity region. The plunger cavity may have a first portion having a diameter, and a second portion having a diameter greater than the diameter of the first portion. The first plunger head may have a diameter, and the second plunger head may have a diameter greater than the diameter of the first plunger head. The first plunger head may be configured for being displaced within the first portion, and the second plunger head may be configured for being displaced within the second portion.

In this embodiment, the passive pressure oscillation assembly further comprises an inlet channel in fluid communication between the relief inlet and the front plunger cavity region, an outlet channel conditionally in fluid communication between the center plunger cavity region and the flow aspiration path, a bypass channel conditionally in fluid communication between the front plunger cavity region and the center plunger cavity region, and a return channel in fluid communication between the flow aspiration path and the rear plunger cavity region.

In this embodiment, the passive pressure oscillation assembly further comprises a spring configured for applying a biasing force to the plunger assembly during operation of the passive pressure oscillation assembly in the normal mode that maintains the first plunger head in a closed position within the plunger cavity, thereby preventing fluid communication between the front plunger cavity region and the center plunger cavity region via the bypass channel, and maintains the second plunger head in a closed position within the plunger cavity, thereby preventing fluid communication between the center plunger cavity region and the aspiration flow path via the outlet channel.

In this embodiment, the plunger assembly is configured for, during operation of the passive pressure oscillation assembly in the oscillatory mode, in response to pressure applied by fluid originating from the pressurized fluid source to the plunger assembly via the input channel, overcoming the biasing force applied by the spring to the plunger assembly to displace the first plunger head from the closed position to an open position that allows fluid communication between the front plunger cavity region and the center plunger cavity region via the bypass channel, and further to displace the second plunger head from the closed position to an open position to allow fluid communication between the center plunger cavity region and the aspiration flow path. The plunger assembly is further configured for, during operation of the passive pressure oscillation assembly in the oscillatory mode, in response to pressure applied by fluid originating from the aspiration flow path to the plunger assembly via the return channel, supplementing the biasing force applied by the spring to the plunger assembly to displace the second plunger head from the open position back to the closed position, and then the first plunger head from the open position back to the closed position. Thus, the oscillatory mode pulses fluid communication between the pressurized fluid source and the aspiration flow path at a first frequency.

In this embodiment, the manifold may further comprise a fluid-actuated valve (e.g., a diaphragm valve) disposed within the aspiration flow path, and an aspiration shutoff channel conditionally in fluid communication between the center plunger cavity region and the fluid-actuated valve. In this case, the second plunger head, when in the closed position, may be configured for preventing fluid communication between the center plunger cavity region and the fluid-actuated valve via the aspiration shutoff channel, and allowing fluid communication between the rear plunger cavity region and the fluid-actuated valve via the aspiration shutoff channel, and when in the open position, may be configured for allowing fluid communication between the center plunger cavity region and the fluid-actuated valve via the aspiration shutoff channel, and preventing fluid communication between the rear plunger cavity region and the fluid-actuated valve via the aspiration shutoff channel.

In this embodiment, the manifold may further comprise a pressure equalization channel conditionally in fluid communication between the flow aspiration path and the center plunger cavity region. In this case, the first plunger head, when in the closed position, may be configured for allowing fluid communication between the flow aspiration path and the center plunger cavity region, and when in the open position, may be configured for preventing fluid communication between the flow aspiration path and the center plunger cavity region.

In this embodiment, the manifold may further comprise a resonator (e.g., a paddle wheel) disposed in the outlet channel. In this case, oscillatory mode further pulses fluid communication between the pressurized fluid source and the aspiration flow path at a second frequency concurrently with and different from the first frequency.

In accordance with a second aspect of the present inventions, an aspiration system comprises the manifold described above, the aspiration source coupled to the aspiration outlet, the aspiration catheter coupled to the aspiration inlet, and the pressurized fluid source coupled to the relief inlet.

In accordance with a third aspect of the present inventions, an aspiration system is provided. The aspiration system comprises an aspiration catheter, an aspiration source fluidly coupled to the aspiration catheter to create an aspiration flow path between the aspiration catheter and the aspiration source, a pressurized fluid source, and a passive pressure oscillation assembly fluidly coupled between the pressurized fluid source and the aspiration flow path. The arrangement and functioning of the passive pressure oscillation assembly may be same as that described above.

In accordance with a fourth aspect of the present inventions, a method of aspirating an occlusion from a patient is provided. The method comprises creating an aspiration flow path between an aspiration catheter located adjacent the occlusion and an aspiration source, preventing fluid communication between a pressurized fluid source (e.g., ambient air or a reservoir containing a liquid) and the aspiration flow path, and pulsing fluid communication (e.g., at a frequency in the range of 0.2 Hz-10 Hz) between the pressurized fluid source and the aspiration flow path automatically in response to a clog in the aspiration catheter. As one example, fluid communication between the pressurized fluid source and the aspiration flow path automatically in response to a clog in the aspiration catheter may comprise interrupting the aspiration flow path, such that the pulsing fluid communication between the pressurized fluid source and the aspiration flow path is directed towards the aspiration catheter. The method may further comprise ceasing pulsing of the fluid communication between the pressurized fluid source and the aspiration flow path automatically in response to removal of the clog in the aspiration catheter. In one method, fluid communication between the pressurized fluid source and the aspiration flow path is simultaneously pulsed at two different frequencies. In one method, fluid communication pulsing between the pressurized fluid source and the aspiration flow path causes pressure pulses to propagate in the aspiration flow path. In another method, fluid communication pulsing between the pressurized fluid source and the aspiration flow path causes fluid backflows to propagate in the aspiration flow path. In still another method, fluid communication between the pressurized fluid source and the aspiration flow path is pulsed concurrently at a first frequency (e.g., in the range of 0.2 Hz-10 Hz) and at a second frequency different from the first frequency (e.g., in the range of 100 Hz-400 Hz).

In accordance with a fifth aspect of the present inventions, another manifold for use with an aspiration catheter, an aspiration source, and a pressurized fluid source (e.g., ambient air or a reservoir containing liquid) is provided.

The manifold comprises an aspiration outlet configured for being fluidly coupled the aspiration source, an aspiration inlet configured for being fluidly coupled to the aspiration catheter, such that an aspiration flow path is formed between the aspiration catheter and the aspiration source, and a relief inlet configured for being fluidly coupled to the pressurized fluid source.

The manifold further comprises a passive pressure oscillation assembly fluidly coupled between the relief inlet and the aspiration flow path, the passive pressure oscillation assembly configured for being operated between a normal mode that prevents fluid communication between the pressurized fluid source and the aspiration flow path, and an oscillatory mode that pulses fluid communication between the pressurized fluid source and the aspiration flow path (e.g., at a frequency in the range of 0.2 Hz-10 Hz). The passive pressure oscillation assembly is configured for being triggered to switch from the normal mode to the oscillatory mode in response to a drop in absolute pressure in the aspiration flow path that creates a negative activation pressure differential between the inlet port and the outlet port equal to or less than −55 kPa (e.g., in the range of −55 kPa to −95 kPa).

In one embodiment, fluid communication pulsing between the pressurized fluid source and the aspiration flow path causes pressure pulses to propagate in the aspiration flow path. In another embodiment, fluid communication pulsing between the pressurized fluid source and the aspiration flow path causes fluid backflows to propagate in the aspiration flow path. The passive pressure oscillation assembly may be configured for being triggered to switch from the oscillatory mode to the normal mode in response to an increase in absolute pressure in the aspiration flow path to a cessation pressure that creates a negative cessation pressure differential between the inlet port and the outlet port greater (e.g., by 10 kPa-25 kPa) than the negative activation pressure differential. In one advantageous embodiment, the negative cessation pressure differential may be much greater than the negative activation pressure differential (e.g., in the range of 40 kPa-90 kPa greater). In one embodiment, the aspiration flow path has a free flow pressure that creates a negative free flow pressure differential between the aspiration inlet and the aspiration outlet. The negative cessation pressure differential may be less than the free flow pressure differential, but in one advantageous embodiment, the negative cessation pressure differential is greater than the free flow pressure differential.

In one embodiment, the passive pressure oscillation assembly comprises a pressure actuated valve configured for opening in response to the clog in the aspiration catheter, thereby allowing a flow of fluid originating from the pressurized fluid source through the pressure actuated valve, and a fluid resonator configured for resonating in response to the flow of fluid originating from the pressurized fluid source through the pressure actuated valve, thereby pulsing the fluid communication between the pressurized fluid source and the aspiration flow path. The pressure actuated valve and fluid resonator may be mechanically coupled to each other or mechanically decoupled from each other. In this embodiment, the fluid resonator may optionally be configured for resonating at a first frequency in response to the flow of fluid originating from the pressurized fluid source through the pressure actuated valve, thereby pulsing the fluid communication between the pressurized fluid source and the aspiration flow path at the first frequency. The pressure actuated valve may further comprise another fluid resonator configured for resonating at a second frequency different from the first frequency in response to the flow of fluid originating from the pressurized fluid source through the pressure actuated valve, thereby pulsing the fluid communication between the pressurized fluid source and the aspiration flow path at the second frequency.

In another embodiment, the passive pressure oscillation assembly comprises a valve seat fluidly coupled to the relief inlet, a movable valve element, and an enlarged flow cavity fluidly coupled to the aspiration flow path. In one specific embodiment, the movable valve element comprises one of a disk and a ball, and the valve seal comprises a valve seat. In another specific embodiment, the movable valve element comprises a disk, and the valve seal comprises a valve cylinder. The enlarged flow cavity has a profile that is larger than a profile of the movable valve element. In this embodiment, the passive pressure oscillation assembly further comprises a spring configured for applying a biasing force to the movable valve element to maintain the movable valve element in a closed position against the valve seal to prevent the flow of the fluid originating from the pressurized fluid source into the enlarged flow cavity. The movable valve element is configured for, in response to the clog in the aspiration catheter that causes the fluid originating from the pressurized fluid source to apply an opposing force to the movable valve element that overcomes the biasing force applied by the spring to the movable valve element, being displaced from the closed position to an open position away from the valve seal and into the enlarged flow cavity to allow the flow of the fluid originating from the pressurized fluid source, through the valve seal, through the enlarged flow cavity, and into the aspiration flow path. The biasing force applied by the spring to the movable valve element, the opposing force applied by the fluid originating from the pressurized fluid source, and the mass of the movable valve element are selected, such that the movable valve element oscillates between the closed position and the open position.

In this embodiment, the passive pressure oscillation assembly may optionally further comprises a plunger cavity disposed between the valve seal and the relief inlet, and a plunger head slidably disposed within the plunger cavity. The plunger head has a channel extending through the plunger head, such that the valve seal is fluidly coupled to the relief inlet to equalize pressure between the pressurized fluid source and the plunger cavity. The passive pressure oscillation assembly further comprises another spring configured for applying a biasing force to the plunger head to maintain the movable valve element away from the stop. The fluid originating from the pressurized fluid source that applies the opposing force to the movable valve element in response to the clog in the aspiration catheter resides within the plunger cavity. The flow of the fluid from the plunger cavity, through the valve seal, through the enlarged flow cavity, and into the aspiration flow path, causes fluid from the pressurized fluid source to apply an opposing force to the plunger that overcomes biasing force applied by the other spring to the plunger, such that the plunger head is displaced within the plunger cavity until the plunger abuts the stopper, thereby preventing flow of the fluid from the plunger cavity, through the valve seal, through the enlarged flow cavity, and into the aspiration flow path, and allowing the biasing force applied by the spring to the movable valve element to displace the movable valve element from the open position back to the closed position. The passive pressure oscillation assembly may further comprise a reduced profile center cavity fluidly coupled between the valve seal and the plunger cavity, in which case, the plunger stop may be formed by a wall of the plunger cavity adjacent the reduced profile center cavity.

In still another embodiment, the passive pressure oscillation assembly comprises a plunger cavity and a plunger assembly slidably disposed within the plunger cavity. The plunger assembly includes a rod, a first plunger head affixed to the rod, and a second plunger head affixed to the rod in a spaced apart relationship with the first plunger head, thereby forming a front plunger cavity region, a center plunger cavity region between the first plunger head and the second plunger head, and a rear plunger cavity region. The plunger cavity may have a first portion having a diameter, and a second portion having a diameter greater than the diameter of the first portion. The first plunger head may have a diameter, and the second plunger head may have a diameter greater than the diameter of the first plunger head. The first plunger head may be configured for being displaced within the first portion, and the second plunger head may be configured for being displaced within the second portion.

In this embodiment, the passive pressure oscillation assembly further comprises an inlet channel in fluid communication between the relief inlet and the front plunger cavity region, an outlet channel conditionally in fluid communication between the center plunger cavity region and the flow aspiration path, a bypass channel conditionally in fluid communication between the front plunger cavity region and the center plunger cavity region, and a return channel in fluid communication between the flow aspiration path and the rear plunger cavity region.

In this embodiment, the passive pressure oscillation assembly further comprises a spring configured for applying a biasing force to the plunger assembly during operation of the passive pressure oscillation assembly in the normal mode that maintains the first plunger head in a closed position within the plunger cavity, thereby preventing fluid communication between the front plunger cavity region and the center plunger cavity region via the bypass channel, and maintains the second plunger head in a closed position within the plunger cavity, thereby preventing fluid communication between the center plunger cavity region and the aspiration flow path via the outlet channel.

In this embodiment, the plunger assembly is configured for, during operation of the passive pressure oscillation assembly in the oscillatory mode, in response to pressure applied by fluid originating from the pressurized fluid source to the plunger assembly via the input channel, overcoming the biasing force applied by the spring to the plunger assembly to displace the first plunger head from the closed position to an open position that allows fluid communication between the front plunger cavity region and the center plunger cavity region via the bypass channel, and further to displace the second plunger head from the closed position to an open position to allow fluid communication between the center plunger cavity region and the aspiration flow path. The plunger assembly is further configured for, during operation of the passive pressure oscillation assembly in the oscillatory mode, in response to pressure applied by fluid originating from the aspiration flow path to the plunger assembly via the return channel, supplementing the biasing force applied by the spring to the plunger assembly to displace the second plunger head from the open position back to the closed position, and then the first plunger head from the open position back to the closed position. Thus, the oscillatory mode pulses fluid communication between the pressurized fluid source and the aspiration flow path at a first frequency.

In this embodiment, the manifold may further comprise a fluid-actuated valve (e.g., a diaphragm valve) disposed within the aspiration flow path, and an aspiration shutoff channel conditionally in fluid communication between the center plunger cavity region and the fluid-actuated valve. In this case, the second plunger head, when in the closed position, may be configured for preventing fluid communication between the center plunger cavity region and the fluid-actuated valve via the aspiration shutoff channel, and allowing fluid communication between the rear plunger cavity region and the fluid-actuated valve via the aspiration shutoff channel, and when in the open position, may be configured for allowing fluid communication between the center plunger cavity region and the fluid-actuated valve via the aspiration shutoff channel, and preventing fluid communication between the rear plunger cavity region and the fluid-actuated valve via the aspiration shutoff channel.

In this embodiment, the manifold may further comprise a pressure equalization channel conditionally in fluid communication between the flow aspiration path and the center plunger cavity region. In this case, the first plunger head, when in the closed position, may be configured for allowing fluid communication between the flow aspiration path and the center plunger cavity region, and when in the open position, may be configured for preventing fluid communication between the flow aspiration path and the center plunger cavity region.

In this embodiment, the manifold may further comprise a resonator (e.g., a paddle wheel) disposed in the outlet channel. In this case, oscillatory mode further pulses fluid communication between the pressurized fluid source and the aspiration flow path at a second frequency concurrently with and different from the first frequency.

In accordance with a sixth aspect of the present inventions, an aspiration system comprises the manifold described above, the aspiration source coupled to the aspiration outlet, the aspiration catheter coupled to the aspiration inlet, and the pressurized fluid source coupled to the relief inlet.

In accordance with a seventh aspect of the present inventions, an aspiration system is provided. The aspiration system comprises an aspiration catheter, an aspiration source fluidly coupled to the aspiration catheter to create an aspiration flow path between the aspiration catheter and the aspiration source, a pressurized fluid source, and a passive pressure oscillation assembly fluidly coupled between the pressurized fluid source and the aspiration flow path. The arrangement and functioning of the passive pressure oscillation assembly may be same as that described above.

In accordance with an eighth aspect of the present inventions, a method of aspirating an occlusion from a patient is provided. The method comprises creating an aspiration flow path between an aspiration catheter located adjacent the occlusion and an aspiration source, preventing fluid communication between a pressurized fluid source (e.g., ambient air or a reservoir containing a liquid) and the aspiration flow path, and pulsing fluid communication (e.g., at a frequency in the range of 0.2 Hz-10 Hz) between the pressurized fluid source and the aspiration flow path automatically in response to a drop in absolute pressure in the aspiration flow path that creates a negative activation pressure differential between the pressurized fluid source and the aspiration flow path equal to or less than −55 kPa (e.g., in the range of −55 kPa to −95 kPa).

The method may further comprise ceasing pulsing of the fluid communication between the pressurized fluid source and the aspiration flow path automatically in response to a rise in absolute pressure in the aspiration flow path that creates a negative cessation pressure differential between the pressurized fluid source and the aspiration flow path greater (e.g., by 10 kPa-25 kPa) than the negative activation pressure differential. In one advantageous method, the negative cessation pressure differential may be much greater than the negative activation pressure differential (e.g., in the range of 40 kPa-90 kPa greater). In one method, fluid communication between the pressurized fluid source and the aspiration flow path is simultaneously pulsed at two different frequencies. In another method, fluid communication pulsing between the pressurized fluid source and the aspiration flow path causes pressure pulses to propagate in the aspiration flow path. In still another method, fluid communication pulsing between the pressurized fluid source and the aspiration flow path causes fluid backflows to propagate in the aspiration flow path. In yet another method, fluid communication between the pressurized fluid source and the aspiration flow path is pulsed concurrently at a first frequency (e.g., in the range of 0.2 Hz-10 Hz) and at a second frequency different from the first frequency (e.g., in the range of 100 Hz-400 Hz). In yet another method, the aspiration flow path has a free flow pressure that creates a negative free flow pressure differential between the aspiration inlet and the aspiration outlet. The negative cessation pressure differential may be less than the free flow pressure differential, but in one advantageous method, the negative cessation pressure differential is greater than the free flow pressure differential.

Other and further aspects and features of embodiments of the disclosed inventions will become apparent from the ensuing detailed description in view of the accompanying figures.

BRIEF DESCRIPTION OF THE DRAWINGS

The drawings illustrate the design and utility of preferred embodiments of the disclosed inventions, in which similar elements are referred to by common reference numerals. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention, which is defined only by the appended claims and their equivalents. In addition, an illustrated embodiment of the disclosed inventions needs not have all the aspects or advantages shown. Further, an aspect or an advantage described in conjunction with a particular embodiment of the disclosed inventions is not necessarily limited to that embodiment and can be practiced in any other embodiments even if not so illustrated.

In order to better appreciate how the above-recited and other advantages and objects of the disclosed inventions are obtained, a more particular description of the disclosed inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 2 is a plan view of an exemplary aspiration catheter used in the aspiration system of FIG. 1;

FIG. 3 is a plan view of the distal end of the aspiration catheter of FIG. 2 in use for aspirating an occlusion from the vasculature of a patient;

FIG. 10A is a plan view of another embodiment of a passive pressure oscillation assembly used in the aspiration system of FIG. 1, particularly showing the passive pressure oscillation assembly in a first state;

FIG. 10B is a plan view of the passive pressure oscillation assembly of FIG. 10A, particularly showing the passive pressure oscillation assembly in a second state;

FIG. 10C is a plan view of the passive pressure oscillation assembly of FIG. 10A, particularly showing the passive pressure oscillation assembly in a third state;

FIG. 10D is a plan view of the passive pressure oscillation assembly of FIG. 10A, particularly showing the passive pressure oscillation assembly in a fourth state;

FIG. 13B is a plan view of the passive pressure oscillation assembly of FIG. 13A, particularly showing the passive pressure oscillation assembly in a second state;

FIG. 13C is a plan view of the passive pressure oscillation assembly of FIG. 13A, particularly showing the passive pressure oscillation assembly in a third state;

FIG. 13D is a plan view of the passive pressure oscillation assembly of FIG. 13A, particularly showing the passive pressure oscillation assembly in a fourth state;

FIG. 13E is a plan view of the passive pressure oscillation assembly of FIG. 13A, particularly showing the passive pressure oscillation assembly in a fifth state.

DETAILED DESCRIPTION OF THE ILLUSTRATED EMBODIMENTS

Figure 1:
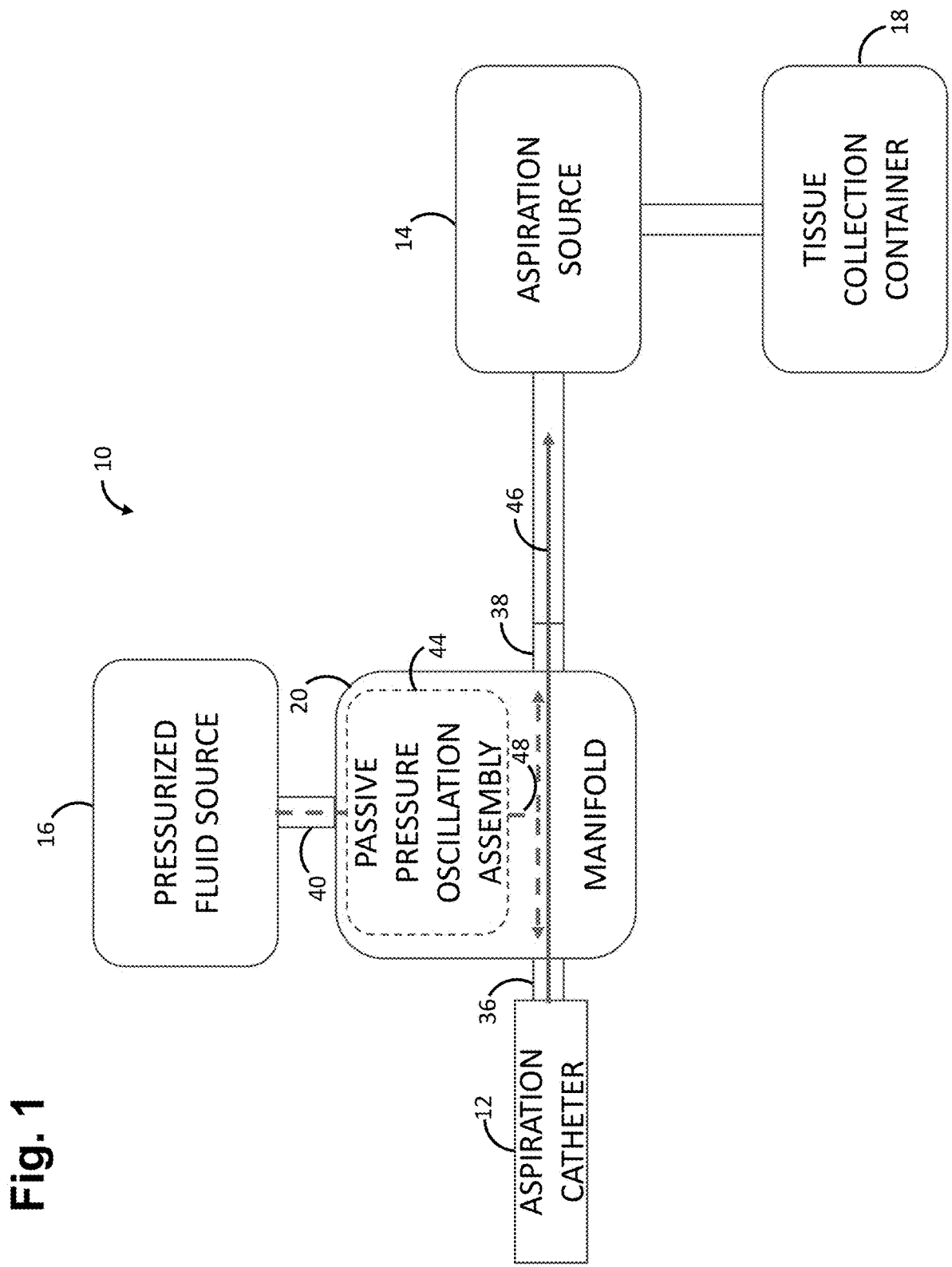
FIG. 1 is a block diagram of one embodiment of an aspiration system constructed in accordance with the present inventions.

Referring to FIG. 1, one embodiment of an occlusion aspiration system 10 constructed accordance with the disclosed inventions will now be described. The occlusion aspiration system 10 generally comprises an aspiration catheter 12, an aspiration source 14, a pressurized fluid source 16, a tissue collection container 18, and a manifold 20.

Referring further to FIGS. 2 and 3, the aspiration catheter 12 comprises an elongated catheter body 22, an aspiration conduit 24 (shown in phantom in FIG. 3) extending through the catheter body 22 between a proximal end 28 and the distal end 30 of the catheter body 22. The proximal end 28 of the aspiration catheter 12 remains outside of a patient 1 and accessible to the operator when the occlusion aspiration system 10 is in use, while the distal end 30 of the catheter body 22 is sized and dimensioned to reach an occlusion 2 (e.g., a clot) with a remote location of the vasculature 1 of the patient, as best shown in FIG. 3. The aspiration catheter 12 comprises a distal inlet port 32 in communication with the aspiration conduit 24 of the aspiration catheter 12, and into which the occlusion 2 is ingested by the aspiration catheter 12.

The aspiration catheter 12 may include a plurality of regions along its length having different configurations and/or characteristics. For example, a distal portion of the catheter body 22 may have an outer diameter less than the outer diameter of a proximal portion of the catheter body 22 to reduce the profile of the distal portion of the catheter body 22 and facilitate navigation in tortuous vasculature. Furthermore, the distal portion of the catheter body 22 may be more flexible than the proximal portion of the catheter body 22. Generally, the proximal portion of the catheter body 22 may be formed from material that is stiffer than the distal portion of the catheter body 22, so that the proximal portion has sufficient pushability to advance through the vasculature 1 of the patient, while the distal portion may be formed of a more flexible material so that it may remain flexible and track more easily over a guidewire to access remote locations in tortuous regions of the vasculature 1. The catheter body 22 may be composed of suitable polymeric materials, metals and/or alloys, such as polyethylene, stainless steel or other suitable biocompatible materials or combinations thereof. In some instances, the proximal portion of the catheter body 22 may include a reinforcement layer, such a braided layer or coiled layer to enhance the pushability of the catheter body 22. The catheter body 22 may include a transition region between the proximal portion and the distal portion of the catheter body 22.

Referring back to FIG. 1, the aspiration source 14 can be, e.g., conventional a pump (e.g., a rotary vane, diaphragm, peristaltic or Venturi pump) or a syringe, configured for generating a low pressure within the aspiration conduit 26 of the aspiration catheter 12. The low pressure is below the ambient air pressure, and thus, can be considered a vacuum capable of aspirating the occlusion 2 within the aspiration conduit 26 of the aspiration catheter 12. The occlusion 2 may be wholly ingested into the aspiration catheter 12 or may be broken up into pieces and ingested piece-by-piece into the aspiration catheter 12. In operation, the aspiration source 14 provides a base level of vacuum for the aspiration catheter 12. This vacuum level may be controlled and adjusted as needed by the user for aspirating tissue. Over any given time period during a tissue removal procedure, the user may set the level of vacuum to be constant or may vary the vacuum level.

The pressurized fluid source 16 may be, e.g., a reservoir containing a liquid, such as saline (e.g., a saline drip bag), or ambient air. It should be appreciated that the fluid source 16 is pressurized to the extent that the fluid has a pressure that is higher than the lowest vacuum level achieved in the aspiration conduit 24 of the aspiration catheter 12 when the aspiration source 14 is operating. Thus, even though the fluid source 16 in the illustrated embodiment may be under low pressure (i.e., at ambient or one atmosphere absolute pressure), the fluid source 16 is pressurized relative to the pressures experienced by the aspiration conduit 24 of the aspiration catheter 12 during operation of the aspiration source 14. The tissue collection container 18 may be any suitable receptacle in fluid communication with the aspiration source 14 via an exhaust line for enabling collection and disposal of aspirated tissue in a sterile manner. Alternatively, the tissue collection container 18 may be located between the aspiration source 14 and the aspiration catheter 12.

The aspiration catheter 12, aspiration source 14, pressurized fluid source 16, and tissue collection container 18 may be conventional in nature.

In contrast, the manifold 20 is unconventional, and provides an interface between the aspiration catheter 12, aspiration source 14, and pressurized fluid source 16 in a manner that facilitates ingestion of the thrombus 2 by the aspiration catheter 12 during no-flow or low-flow conditions (e.g., if the thrombus 2 clogs the aspiration conduit 24 of the aspiration catheter 12 or otherwise there is a flow anomaly in the aspiration circuit of the system 10), while maximizing efficiency of the aspiration process during free-flow conditions (e.g., when the aspiration conduit 24 is not clogged and the aspiration circuit of the system 10 is operating as intended).

The manifold 20 comprise an aspiration inlet 36 coupled to the aspiration catheter 12, and an aspiration outlet 38 coupled to the aspiration source 14, such that an aspiration flow path 46 is formed from the aspiration catheter 12 to the aspiration source 14, and a relief inlet 40 coupled to the pressurized fluid source 16. The manifold 20 may be coupled to the aspiration catheter 12, aspiration source 14, and pressurized fluid source 16 via the use of conventional catheters (not shown) or may alternatively be integrated with the aspiration catheter 12, aspiration source 14, and pressurized fluid source 16 without the use of connectors. The manifold 20 further comprises a passive pressure oscillation assembly 44 coupled between the relief inlet 40 and the aspiration flow path 46. Significantly, the passive pressure oscillation assembly 44 is configured for dynamically loading (i.e., rapidly changing the vacuum level) the aspiration conduit 24 of the aspiration catheter 12, and in particular, cyclically loading the aspiration conduit 24 only during the no-flow or low-flow conditions. The passive pressure oscillation assembly 44 accomplishes this without user input and without the use of electronic sensors. Furthermore, the passive pressure oscillation assembly 44 may be made to be very compact, such that it can be fitted within manifold 20 will little additional bulk. The passive pressure oscillation assembly 44 may be disabled simply be blocking the relief inlet 40.

To this end, the passive pressure oscillation assembly 44 is configured for being operated between a normal mode that prevents fluid communication along a relief path 48 between the pressurized fluid source 16 and the aspiration flow path 46, such that the absolute pressure in the aspiration flow path 46 remains relatively constant and is only acted upon by the aspiration source 14, and an oscillatory mode that pulses fluid communication along the relief path 48 between the pressurized fluid source 16 and the aspiration flow path 46, such that the absolute pressure in the aspiration flow path 46 oscillates within a range of predetermined frequencies. The passive pressure oscillation assembly 44 is configured for being triggered to switch from the normal mode to the oscillatory mode in response to a clog in the aspiration conduit 24 of the aspiration catheter 12 or otherwise a flow anomaly in the aspiration conduit of the system 10, and conversely, for being triggered to switch from the oscillatory mode to the normal mode in response to removal or clearance of the clog from the aspiration conduit 24 of the aspiration catheter 12 or otherwise resolution of the flow anomaly in the aspiration circuit of the system 10. In the illustrated embodiment, fluid communication pulsing between the pressurized fluid source 16 and the aspiration flow path 46 causes pressure pulses to propagate down the aspiration conduit 24 of the aspiration catheter 12 at the predetermined frequency. Simultaneously, fluid communication pulsing between the pressurized fluid source 16 and the aspiration flow path 46 causes fluid backflows to propagate down the aspiration conduit 24 of the aspiration catheter 12.

The passive pressure oscillation assembly 44 may be designed to pulse fluid communication along the relief path 48 between the pressurized fluid source 16 and the aspiration flow path 46 at a predetermined frequency, such that the absolute pressure in the aspiration flow path 46 oscillates at that predetermined frequency. As one example, the predetermined frequency of the pressure oscillations induced in the aspiration flow path 46 by the passive pressure oscillation assembly 44 may match the natural resonance of the fluid column within the aspiration conduit 24 of the aspiration catheter 12, such that energy transfer from the aspiration flow path 46 to the aspiration conduit 24 of the aspiration catheter 12, and thus propagation of the pressure pulses down the aspiration conduit 24 of the aspiration catheter 12, is maximized. As another example, the predetermined frequency of the pressure oscillations induced in the aspiration flow path 46 by the passive pressure oscillation assembly 44 may be selected based on the visco-elastic properties of thrombus 2 expected to be ingested by the aspiration catheter 12. That is, a clogged thrombus 2 with a softer consistency may be more susceptible to maceration, and thus subsequent ingestion, in response to relatively low-frequency, high-amplitude oscillations, whereas a clogged thrombus 2 with a harder consistency may be more susceptible to maceration, and thus subsequent ingestion, in response to relatively high-frequency, low-amplitude oscillations.

The oscillation of the passive pressure oscillation assembly 44 may optionally cause sound to emanate, and can serve as an automatic audible signal to the user that a clog in the aspiration conduit 24 of the aspiration catheter 12 has occurred. In an optional embodiment, the passive pressure oscillation assembly 44 may be designed to pulse fluid communication between the pressurized fluid source 16 and the aspiration flow path 46 simultaneously at two or more different frequencies. For example, because determining the type of material properties of the thrombus 2 will not be known ahead of time, it may be desirable to pulse fluid communication between the pressurized fluid source 16 and the aspiration flow path 46 simultaneously at a relatively high frequency and at a relatively low frequency, such that the pressure profile in the aspiration conduit 24 of the aspiration catheter 12 is a composite of the low-frequency and high-frequency oscillations.

In the illustrated embodiment, the passive pressure oscillation assembly 44 takes advantage of the correlation between the different flow conditions of the aspiration catheter 12 and the resulting fluid pressure levels in the aspiration flow path 46. In particular, it is expected that, in the case of a no-flow or low-flow condition where there is a clog in the aspiration conduit 24 of the aspiration catheter 12, or otherwise a flow anomaly in the aspiration circuit of the system 10, the vacuum in the aspiration flow path 46 will precipitously increase (i.e., the absolute pressure in the aspiration flow path 46 will precipitously decrease), thereby causing the negative pressure differential between the external ambient pressure and the aspiration flow path 46 to increase to a very high level (e.g., at least −55 kPa), which, assuming no intervention by the passive pressure oscillation assembly 44, may even cause boiling or cavitation of the aspirate within the aspiration flow path 46 (e.g., if the such negative pressure differential below −95 kPa). In contrast, it is also expected that, in the case of a free-flow condition where the aspiration catheter 12 has been unclogged, or otherwise, the flow anomaly in the aspiration circuit of the system 10 has been resolved, the vacuum in the aspiration flow path 46 will precipitously decrease (i.e., the absolute pressure in the aspiration flow path 46 will precipitously increase) to a lower level (e.g., less than −50 kPa), thereby causing the negative pressure differential between the external ambient pressure and the aspiration flow path 46 to decrease to a lower level. The passive pressure oscillation assembly 44 keys off these negative pressure differentials when switching between the normal mode and the oscillatory mode.

To this end, the passive pressure oscillation assembly 44 comprises an inlet port 50 (shown in FIG. 5) in fluid communication with the pressurized fluid source 16 and an outlet port 52 (shown in FIG. 5) in fluid communication with the aspiration flow path 46, such that the passive pressure oscillation assembly 44 is exposed to a negative pressure differential between pressurized fluid source 16 and the fluid in the aspiration flow path 46. The passive pressure oscillation assembly 44 is triggered to switch from the normal mode and the oscillatory mode, and conversely, from the oscillatory mode to the normal mode, based on this negative pressure differential.

In particular, the passive pressure oscillation assembly 44 is designed to be triggered to switch from the normal mode to the oscillatory mode in response to a drop in absolute pressure in the aspiration flow path 46 that creates a negative activation pressure differential between the inlet port 50 and the outlet port 52 of the passive pressure oscillation assembly 44 correlated to the negative pressure differential between the aspiration flow path 46 and the blood pressure experienced by the aspiration catheter 12 when the aspiration conduit 24 of the aspiration catheter 12 is clogged or the aspiration circuit of the system 10 otherwise experiences a flow anomaly (no-flow or low-flow condition); and conversely, the passive pressure oscillation assembly 44 is designed to be triggered to switch from the oscillatory mode to the normal mode in response to an increase in absolute pressure in the aspiration flow path 46 that creates a negative cessation pressure differential between the inlet port 50 and the outlet port 52 of the passive pressure oscillation assembly 44 correlated to the negative pressure differential between the aspiration flow path 46 and the blood pressure experienced by the aspiration catheter 12 when the aspiration conduit 24 of the aspiration catheter 12 is unclogged or the aspiration circuit of the system 10 is operating as intended (free-flow condition). Significantly, it is important that the cessation pressure differential always be negative, such that any clogged thrombus 2 does not get ejected out of the distal end 30 of the catheter body 22.

In the case where the pressurized fluid source 16 is at the external ambient pressure, the negative activation pressure differential of the passive pressure oscillation assembly 44 will essentially differ from the negative pressure differential between the aspiration flow path 46 and the blood pressure experienced by the aspiration catheter 12 by a known offset during a no-flow or low-flow condition, and likewise, the negative cessation pressure differential of the passive pressure oscillation assembly 44 will essentially differ from the negative pressure differential between the aspiration flow path 46 and the blood pressure experienced by the aspiration catheter 12 by a known offset during a free-flow condition. In this manner, the passive pressure oscillation assembly 44 may be configured to self-calibrate to a time-varying ambient external environment.

In this case, the range in which the negative activation pressure differential of the passive pressure oscillation assembly 44 is designed may have an upper limit of −55 kPa, such that the passive pressure oscillation assembly 44 is quickly triggered to switch from the normal mode to the oscillatory mode, but not so low that the passive pressure oscillation assembly 44 is triggered to switch from the normal mode to the oscillatory mode during active and productive ingestion of the thrombus 2 into the distal end 30 of the aspiration catheter 12, and may have a lower limit of −95 kPa to ensure that the boiling point of fluid (i.e. blood at 37° C.) in the aspiration flow path 46 is never reached, although it should be appreciated that the passive pressure oscillation assembly 44 may be designed to have a negative activation pressure differential that falls anywhere within the range of −55 kPa to −95 kPa. The negative cessation pressure differential of the passive pressure oscillation assembly 44 should be designed relative to the negative activation pressure differential of the passive pressure oscillation assembly 44, preferably, substantially less than the negative activation pressure differential (e.g., within the range of 10 kPa-25 kPa greater than the negative activation pressure differential), such that hysteresis is built into the passive pressure oscillation assembly 44. In this manner, the pressure oscillations induced in the aspiration flow path 46 by the passive pressure oscillation assembly 44 will not inadvertently trigger the passive pressure oscillation assembly 44 back into the normal mode until the aspiration catheter 12 is in a free-flow condition. It should be noted that, in low-resonant frequency scenarios, the negative activation pressure differential and the negative cessation pressure differential may be the same, in which case, the passive pressure oscillation assembly 44 will be re-triggered after each increase in the negative pressure differential in the aspiration flow path 46 to switch from the normal mode to the oscillation mode in response to the decrease in the absolute pressure in the aspiration flow path 46 caused by the aspiration source 18.

In an optional embodiment, the passive pressure oscillation assembly 44 may be designed with multiple negative activation pressure differentials, and correspondingly, multiple negative cessation pressure differentials. For example, the passive pressure oscillation assembly 44 may be designed to have a first negative activation pressure differential, e.g., at −50 kPa, such that the passive pressure oscillation assembly 44 is triggered to switch from the normal mode to a relatively fast oscillatory mode to facilitate ingestion of the thrombus 2 into the distal end 30 of the aspiration catheter 12 prior to a clog in the aspiration conduit 24 of the aspiration catheter 12. Operation of the passive pressure oscillation assembly 44 in the relatively high oscillatory mode may cause high frequency, but low volume, pulses to propagate down the aspiration conduit 24 of the aspiration catheter 12, thereby facilitating ingestion of the thrombus 2 without overly impeding volume flow. The passive pressure oscillation assembly 44 may be further designed to have a second negative activation pressure differential, e.g., at −55 kPa, such that the passive pressure oscillation assembly 44 is triggered to operate in a relatively slow oscillatory mode to facilitate clearing of a thrombus 2 that is clogged in the distal end 30 of the aspiration catheter 12. Operation of the passive pressure oscillation assembly 44 in the relatively high oscillatory mode may cause low frequency, but high volume, pulses to propagate down the aspiration conduit 24 of the aspiration catheter 12 in an attempt to dislodge the clogged thrombus 2 from the distal end 30 of the aspiration catheter 12. Thus, if the thrombus 2 is ingested without ever clogging the distal end 30 of the aspiration catheter 12, only the relatively fast oscillatory mode of the passive pressure oscillation assembly 44 will be triggered, whereas the relatively slow oscillatory mode of the passive pressure oscillation assembly 44 will only be triggered when the thrombus 2 clogs the distal end 30 of the aspiration catheter 12.

It should be appreciated that the pressurized fluid source 16 may have a pressure substantially different from the external ambient pressure experienced by the aspiration catheter 12, in which case, the negative activation pressure differential of the passive pressure oscillation assembly 44 will be substantially different from the negative pressure differential between the aspiration flow path 46 and the ambient external environment experienced by the aspiration catheter 12 during a no-flow or low-flow condition, and likewise, the negative cessation pressure differential of the passive pressure oscillation assembly 44 will be substantially different from the negative pressure differential between the aspiration flow path 46 and the ambient external environment experienced by the aspiration catheter 12 during a free-flow condition. In this latter case, this difference can be taken into account when designing the negative activation pressure differential and negative cessation pressure differential of the passive pressure oscillation assembly 44. For example, if the pressurized fluid source 16 has a pressure substantially higher than the external ambient pressure, then the passive pressure oscillation assembly 44 should be designed to a negative activation pressure differential and negative cessation pressure differential that is higher to account for the higher fluid pressure that will be experienced by the inlet port 50 of the passive pressure oscillation assembly 44.

Figure 4:
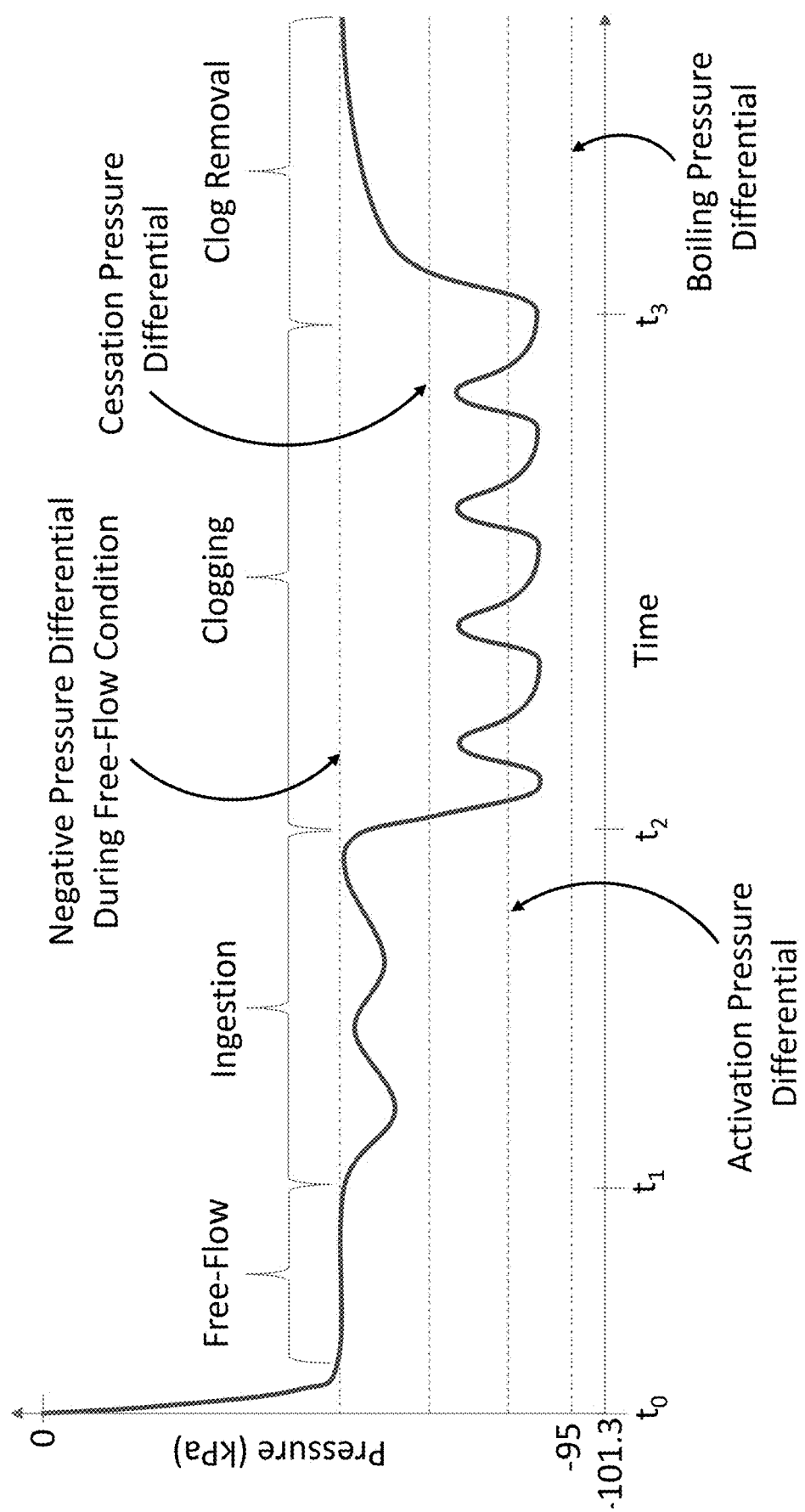
FIG. 4 is a timing diagram illustrating the negative pressure differential between a pressurized fluid source and an aspiration flow path created in the aspiration system of FIG. 1 over time.

As one example, and with reference to FIG. 4, the aspiration source 14 is first activated, such that the aspiration catheter 12 is in a free-flow condition between arbitrary time $t_0$ and $t_1$, and the negative pressure differential between the absolute pressure in the aspiration flow path 46 and the external ambient pressure experienced by the aspiration catheter 12 (in this case, the negative pressure differential between the inlet port 50 and the outlet port 52 of the passive pressure oscillation assembly 44) is at a free-flow negative pressure differential where the aspiration catheter 12 is only ingesting blood. During this time, the passive pressure oscillation assembly 44 remains in the normal mode. In this manner, the aspiration efficiency of the system 10 is maximized during free-flow conditions.

Between arbitrary time $t_1$ and arbitrary time $t_2$, the thrombus 2 is actively being ingested into the distal end 30 of the aspiration catheter 12, such that the negative pressure differential between the absolute pressure in the aspiration flow path 46 and the external ambient pressure experienced by the aspiration catheter 12 drops below the free-flow negative pressure differential, but not below the negative activation pressure differential of the passive pressure oscillation assembly 44, which is designed for a no-flow or low-flow condition indicative of a clogged aspiration catheter 12 or flow anomaly in the aspiration conduit of the system 10. During arbitrary time $t_0$ and time $t_2$, the passive pressure oscillation assembly 44 remains in the normal mode.

At arbitrary time $t_2$, however, the aspiration catheter 12 becomes clogged with the thrombus 2, resulting in a precipitous decrease in the negative pressure differential between the absolute pressure in the aspiration flow path 46 and the external ambient pressure experienced by the aspiration catheter 12 to a level below the negative activation pressure differential, which in the illustrated case, is at −75 kPa. Thus, at or just after the arbitrary time $t_2$, the clogged aspiration catheter 12 (no-flow or low-flow condition) triggers the passive pressure oscillation assembly 44 to switch from the normal mode to the oscillatory mode, resulting in pressure oscillations in the aspiration flow path 46 that cause pressure pulses to propagate down the aspiration conduit 24 of the aspiration catheter 12, thereby facilitating clearance of the clogged thrombus 2 at the distal end 24 of the aspiration catheter 12 at the arbitrary time $t_3$. Clearance of the clogged thrombus 2 at the distal end 24 of the aspiration catheter 12 results in a precipitous increase in the negative pressure differential between the absolute pressure in the aspiration flow path 46 and the external ambient pressure experienced by the aspiration catheter 12 to a level above the negative cessation pressure differential, which in the illustrated case, is at −50 kPa. Thus, at or just after the arbitrary time $t_3$, the cleared aspiration catheter 12 (free-flow condition) triggers the passive pressure oscillation assembly 44 to switch from the oscillatory mode to the normal mode, ceasing pressure oscillations in the aspiration flow path 46, and thus ceasing pressure pulses from propagating down the aspiration conduit 24 of the aspiration catheter 12.

In the optional embodiment where the passive pressure oscillation assembly 44 operates in multiple oscillatory modes (e.g., a high frequency oscillatory mode and a low frequency oscillatory mode), the passive pressure oscillation assembly 44 may be operated in the high frequency oscillatory mode between the arbitrary time $t_1$ and arbitrary time $t_2$, such that active ingestion of the thrombus 2 into the distal end 30 of the aspiration catheter 12 is facilitated by the high-frequency, but low volume, pressure pulses propagating down the aspiration conduit 24 of the aspiration catheter 12, and then if the thrombus 2 clogs the distal end 30 of the aspiration catheter 12, may be then operated in the low frequency oscillatory mode between the arbitrary time $t_2$ and the arbitrary time $t_3$, such that clearance of the clogged thrombus 2 from the distal end 30 of the aspiration catheter 12 is facilitated by the low-frequency, high volume, pressure pulses propagating down the aspiration conduit 24 of the aspiration catheter 12.

Figure 5:
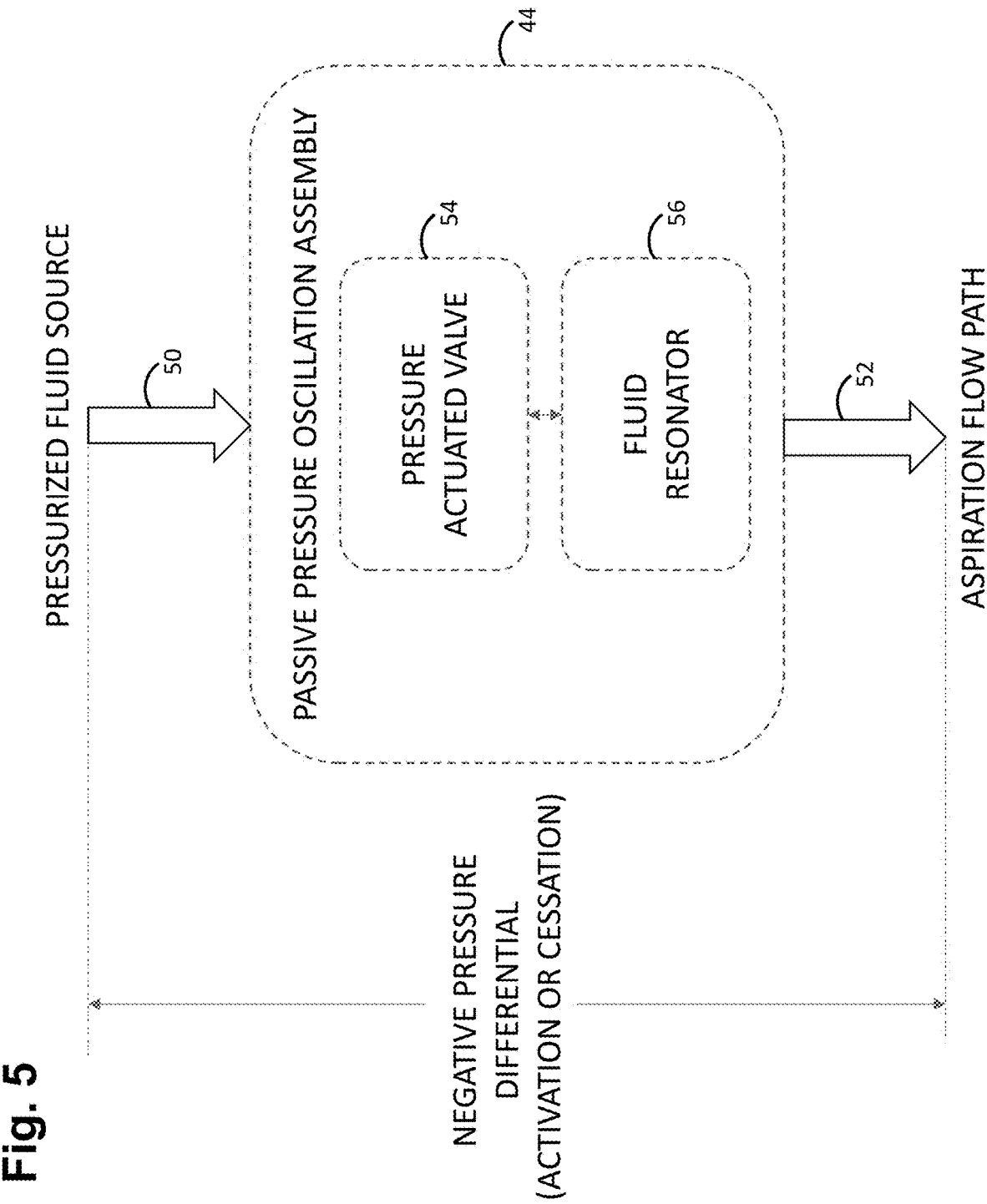
FIG. 5 is a block diagram of one embodiment of a passive pressure oscillation assembly used in the aspiration system of FIG. 1.

Referring to FIG. 5, the passive pressure oscillation assembly 44 comprises a pressure actuated valve 54 and a fluid (e.g., hydraulic or pneumatic) resonator 56. The pressure actuated valve 54 is configured for opening in response to a drop in absolute pressure in the aspiration flow path 28 that creates a negative activation pressure differential between the inlet port 50 and the outlet port 52 (e.g., indicative of a clog in the aspiration conduit 24 of the aspiration catheter 12), thereby allowing the flow of fluid from the pressurized fluid source 16 through the pressure actuated valve 54; and conversely, for closing in response to an increase in absolute pressure in the aspiration flow path 28 that creates a negative cessation pressure differential between the inlet port 50 and the outlet port 52 (e.g., indicative of the removal or clearance of a clog from the aspiration conduit 24 of the aspiration catheter 12), thereby preventing the flow of fluid from the pressurized fluid source 16 through the pressure actuated valve 54. The fluid resonator 56 is configured for resonating at a predetermined frequency in response to the flow of fluid from the pressurized fluid source 16 through the pressure actuated valve 54, thereby pulsing the fluid communication between the pressurized fluid source 16 and the aspiration flow path 46 at the predetermined frequency; and conversely, configured for ceasing resonation in response to the prevention of the flow of fluid from the pressurized fluid source 16 through the pressure actuated valve 54.

In one embodiment, the pressure actuated valve 54 and fluid resonator 56 are mechanically coupled to each other. In this embodiment, although the mechanically coupled pressure actuated valve 54 and fluid resonator 56 must be dependently designed to satisfy both the opening and resonant frequency criteria, it results in a simpler mechanical design that can be more easily implemented into the passive pressure oscillation assembly 44. In another embodiment, the pressure actuated valve 54 and fluid resonator 56 are mechanically decoupled from each other. In this embodiment, the mechanically decoupled pressure actuated valve 54 and fluid resonator 56 allows the opening/closing criteria and resonant frequency criteria to be independently optimized, although resulting in a mechanical design that may be more complicated than the mechanical design of the embodiment with the mechanically coupled pressure actuated valve 54 and fluid resonator 56.

As discussed above, the passive pressure oscillation assembly 44 may optionally be designed to have two negative activation pressure differentials, and/or two negative cessation pressure differentials, and/or pulse fluid communication between the pressurized fluid source 16 and the aspiration flow path 46 simultaneously at two different frequencies.

In an alternative embodiment, the fluid resonator 56 pulses fluid communication between the pressurized fluid source 50 and the aspiration flow path 46 automatically in response to a clog in the aspiration catheter 12 by interrupting the aspiration flow path 46, such that the pulsing fluid communication between the pressurized fluid source 50 and the aspiration flow path 46 is directed towards the aspiration catheter 12.

Figure 6:
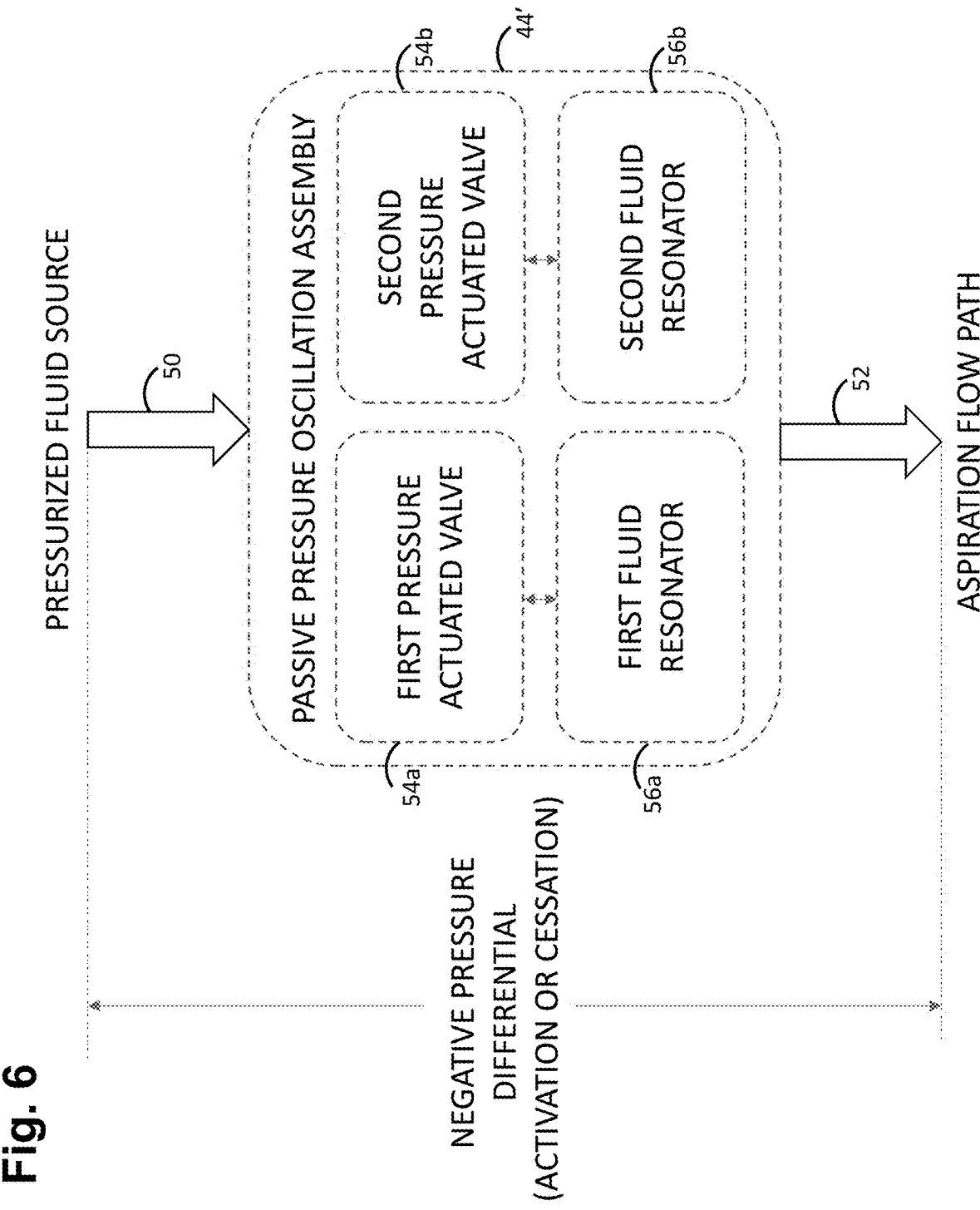
FIG. 6 is a block diagram another embodiment of a passive pressure oscillation assembly used in the aspiration system of FIG. 1.

Referring to FIG. 6, an alternative embodiment of a passive pressure oscillation assembly 44' comprises two parallel sets of pressure actuated valve assemblies and fluid resonators. In particular, the passive pressure oscillation assembly 44' comprises a first pressure actuated valve 54*a*, a first fluid resonator 56*a*, a second pressure actuated valve 54*b*, and a second fluid resonator 56*b*.

The first pressure actuated valve 54*a* is configured for opening in response to a drop in absolute pressure in the aspiration flow path 28 that creates a first negative activation pressure differential between the inlet port 50 and the outlet port 52, thereby allowing a flow of fluid from the pressurized fluid source 16 through the first pressure actuated valve 54*a*; and conversely, for closing in response to an increase in absolute pressure in the aspiration flow path 28 that creates a first negative cessation pressure differential between the inlet port 50 and the outlet port 52, thereby preventing the flow of fluid from the pressurized fluid source 16 through the pressure actuated valve 54. The first fluid resonator 56*a* is configured for resonating at a first predetermined frequency in response to the flow of fluid from the pressurized fluid source 16 through the first pressure actuated valve 54*a*, thereby pulsing the fluid communication between the pressurized fluid source 16 and the aspiration flow path 46 at the first predetermined frequency; and conversely, configured for ceasing resonation in response to the prevention of the flow of fluid from the pressurized fluid source 16 through the first pressure actuated valve 54*a*.

The second pressure actuated valve 54*b* is configured for opening in response to a drop in absolute pressure in the aspiration flow path 28 that creates a second negative activation pressure differential between the inlet port 50 and the outlet port 52, thereby allowing a flow of fluid from the pressurized fluid source 16 through the second pressure actuated valve 54*b*; and conversely, for closing in response to an increase in absolute pressure in the aspiration flow path 28 that creates a second negative cessation pressure differential between the inlet port 50 and the outlet port 52, thereby preventing the flow of fluid from the pressurized fluid source 16 through the pressure actuated valve 54. The second fluid resonator 56*b* is configured for resonating at a second predetermined frequency in response to the flow of fluid from the pressurized fluid source 16 through the second pressure actuated valve 54*b*, thereby pulsing the fluid communication between the pressurized fluid source 16 and the aspiration flow path 46 at the second predetermined frequency; and conversely, configured for ceasing resonation in response to the prevention of the flow of fluid from the pressurized fluid source 16 through the second pressure actuated valve 54*b*.

The first and second negative activation pressure differentials may be the same (e.g., both indicating a clog in the aspiration conduit 24 of the aspiration catheter 12) or may be different (e.g., one indicating active thrombus ingestion into the aspiration catheter 12, and the other indicating clogging of the aspiration conduit 24 of the aspiration catheter 12). The first and second negative cessation pressure differentials may be the same (e.g., both indicating ingestion or removal of a clog in the aspiration conduit 24 of the aspiration catheter 12), although in alternative embodiments, the first and second negative cessation pressure differentials may be different. The first and second predetermined frequencies may be the same or may be different (e.g., one being a relatively high-frequency for disrupting a clogged thrombus 2 with a harder consistency, and the other being a relatively low-frequency for disrupting a clogged thrombus 2 with a softer consistency). The first pressure actuated valve 54*a* and the first fluid resonator 56*a* may be mechanically coupled to each other or mechanically decoupled from each other, and the second pressure actuated valve 54*b* and the second fluid resonator 56*b* may likewise be mechanically coupled to each other or mechanically decoupled from each other. Furthermore, the first pressure actuated valve 54*a* and the second pressure actuated valve 54*b* may be coupled to each other to essentially form a multi-outlet valve assembly that distributes flows to either one or the other or both of the fluid resonators 56*a*, 56*b* in response to various levels of a single sensed pressure differential.

Although the passive pressure oscillation assembly 44' is illustrated in FIG. 6 as comprising only two parallel sets of pressure actuated valve assemblies and fluid resonators, the passive pressure oscillation assembly 44' may alternatively comprise more than two parallel sets of pressure actuated valve assemblies and fluid resonators.

Figure 7:
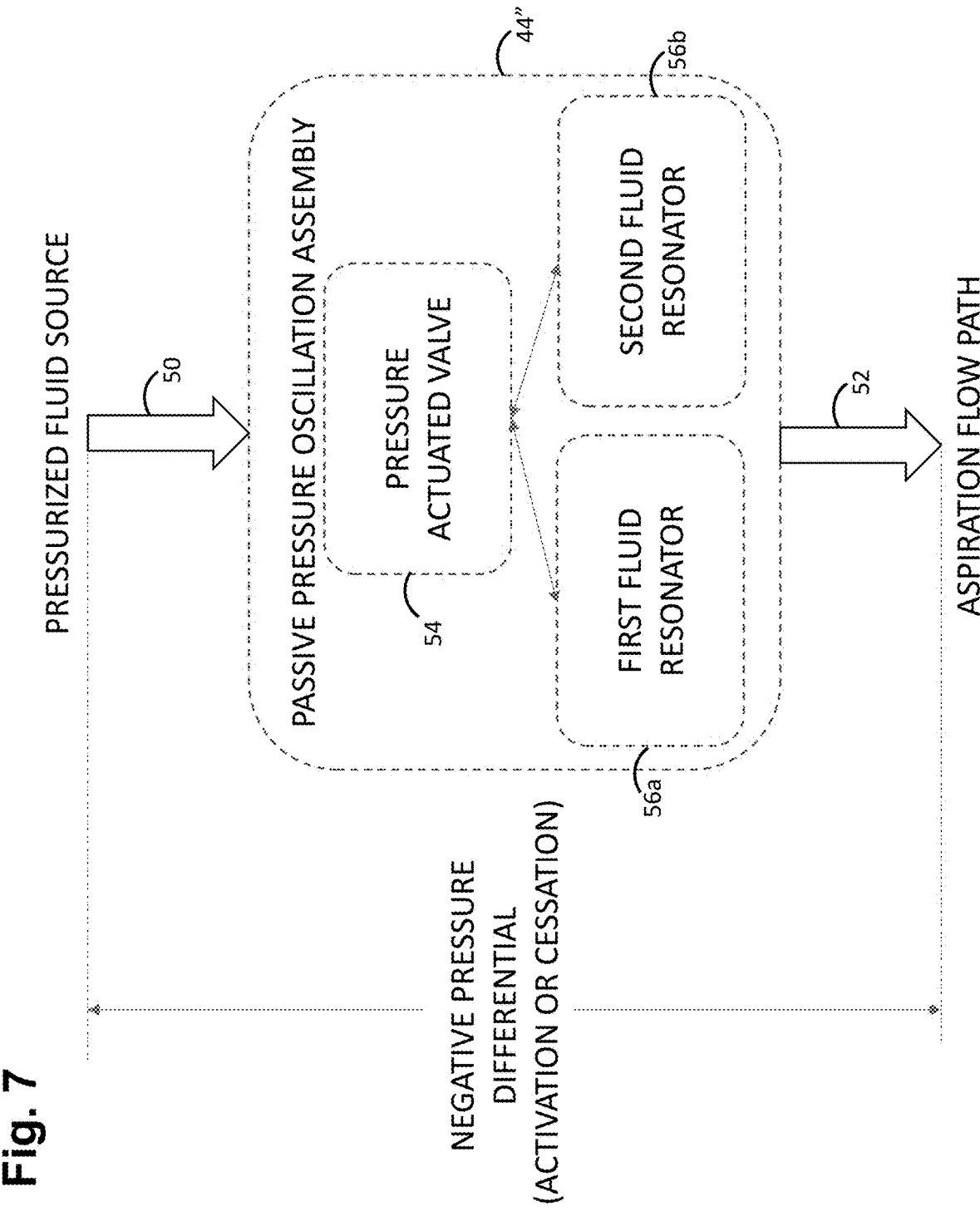
FIG. 7 is a block diagram of still another embodiment of a passive pressure oscillation assembly used in the aspiration system of FIG. 1.

Referring to FIG. 7, another alternative embodiment of a passive pressure oscillation assembly 44" comprises a single pressure actuated valve 54, a first fluid resonator 56*a*, and a second fluid resonator 56*b*.

The pressure actuated valve 54 is configured for opening in response to a drop in absolute pressure in the aspiration flow path 28 that creates a negative activation pressure differential between the inlet port 50 and the outlet port 52, thereby allowing the flow of fluid from the pressurized fluid source 16 through the first pressure actuated valve 54; and conversely, for closing in response to an increase in absolute pressure in the aspiration flow path 28 that creates a negative cessation pressure differential between the inlet port 50 and the outlet port 52 (e.g., indicative of the removal or clearance of a clog from the aspiration conduit 24 of the aspiration catheter 12), thereby preventing the flow of fluid from the pressurized fluid source 16 through the pressure actuated valve 54.

The first fluid resonator 56*a* is configured for resonating at a first predetermined frequency in response to the flow of fluid from the pressurized fluid source 16 through the pressure actuated valve 54, thereby pulsing the fluid communication between the pressurized fluid source 16 and the aspiration flow path 46 at the first predetermined frequency; and conversely, configured for ceasing resonation in response to the prevention of the flow of fluid from the pressurized fluid source 16 through the pressure actuated valve 54. The second fluid resonator 56*b* is configured for resonating at a second predetermined frequency in response to the flow of fluid from the pressurized fluid source 16 through the pressure actuated valve 54, thereby pulsing the fluid communication between the pressurized fluid source 16 and the aspiration flow path 46 at the second predetermined frequency; and conversely, configured for ceasing resonation in response to the prevention of the flow of fluid from the pressurized fluid source 16 through the pressure actuated valve 54.

The first and second predetermined frequencies may be the same or may be different (e.g., one being a relatively high-frequency for disrupting a clogged thrombus 2 with a harder consistency, and the other being a relatively low-frequency for disrupting a clogged thrombus 2 with a softer consistency). The first and second fluid resonators 56*a*, 56*b* may be mechanically decoupled from the pressure actuated valve 54.

Figure 8A:
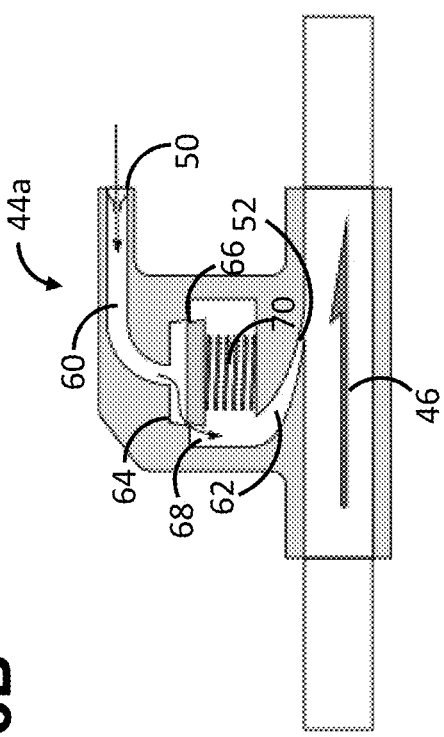
FIG. 8A is a plan view of one embodiment of a passive pressure oscillation assembly used in the aspiration system of FIG. 1, particularly showing the passive pressure oscillation assembly in a closed position.
Figure 8B:
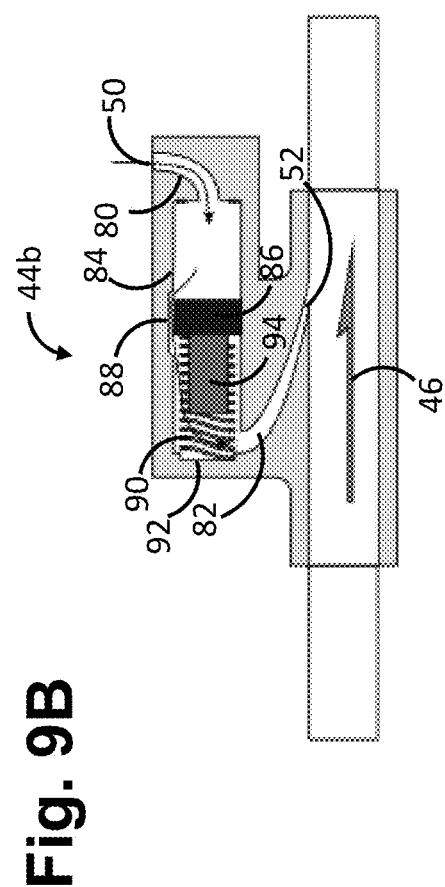
FIG. 8B is a plan view of the passive pressure oscillation assembly of FIG. 8A, particularly showing the passive pressure oscillation assembly in an open position.

Referring now to FIGS. 8A and 8B, one embodiment of a passive pressure oscillation assembly 44*a* will be described. The passive pressure oscillation assembly 44a comprises an inlet channel 60 fluidly coupled to the pressurized fluid source 16 via the inlet port 50, and an outlet channel 62 fluidly coupled to the aspiration flow path 46 via the outlet port 52. The passive pressure oscillation assembly 44a further comprises a valve seal in the form of a seat 64 fluidly coupled to the inlet port 50 via the inlet channel 60, a movable valve element in the form of a valve disk 66 operably associated with the valve seat 64, and an enlarged flow cavity 68 fluidly coupled between the valve seat 64 and the aspiration flow path 46 via the outlet channel 62 and outlet port 52. The valve disk 66 is configured for being alternately displaced between a closed position to seal against the valve seat 64, and in this case, within the valve seat 64 (see FIG. 8A), and an open position away from the valve seat 64, and in this case outside of the valve seat 64 (see FIG. 8B). The passive pressure oscillation assembly 44a further comprises a restoring spring 70 affixed within the enlarged flow cavity 68 and mechanically coupled to the valve disk 66 for applying a biasing force to the valve disk 66 in a manner that maintains the valve disk 66 in the closed position within the valve seat 64 until the passive pressure oscillation assembly 44a is triggered to switch from the normal mode to the oscillatory mode, as will be described in further detail below.

The valve disk 66 and valve seat 64 have the same geometric profile (in this case, a flattened trapezoidal shape cross-section), such that the valve disk 66, when in the closed position within the valve seat 64 (see FIG. 8A), seals against the valve seat 64 to prevent the flow of fluid originating from the pressurized fluid source 16 (in this case, fluid that has been introduced into the inlet channel 60 via the inlet port 50) into the enlarged flow cavity 68. The enlarged flow cavity 68 has a geometric profile that is larger than the geometric profile of the valve disk 66, such that the valve disk 66, when in the open position outside of the valve seat 64 and within the enlarged flow cavity 68 (see FIG. 8B), allows the flow of fluid originating from pressurized fluid source 16 (in this case, fluid that has been introduced into the inlet channel 60 via the inlet port 50), into the enlarged flow cavity 68, through the outlet channel 62, and into the aspiration flow path 46 via the outlet port 52.

In response to a clog in the aspiration conduit 24 of the aspiration catheter 12, or otherwise the occurrence of an anomaly in the aspiration circuit of the system 10, a no-flow or low-flow condition occurs in the aspiration flow path 46, and as a result, the absolute pressure in the aspiration flow path 46 drops to a level that creates a negative activation pressure differential between the inlet port 50 (and thus the inlet channel 60) and the outlet port 52 (and thus the enlarged flow cavity 68), which causes the fluid in the inlet channel 60 to apply an opposing force to the valve disk 66 that overcomes the biasing force applied by the restoring spring 70 to the valve disk 66. As a result, the valve disk 66 is displaced from the closed position (see FIG. 8A) to the open position (see FIG. 8B). The negative activation pressure differential of the passive pressure oscillation assembly 44a will be based on the area of the valve disk 66 exposed to the fluid in the inlet channel 60 (the negative activation pressure differential will decrease in proportion to the exposed area of the valve disk 66) and the spring constant of the restoring spring 70 (the negative action pressure differential will increase in proportion to the spring constant of the restoring spring 70). Thus, the negative activation pressure differential of the passive pressure oscillation assembly 44a may be selected by judicially selecting the exposed area of the valve disk 66 and the spring constant of the restoring spring 70.

The passive pressure oscillation assembly 44a is designed in such a manner that, once the valve disk 66 is displaced from the closed position to the open position (i.e., the valve "cracks"), the passive pressure oscillation assembly 44a resonates (i.e., the valve disk 66 alternately switches (oscillates) between the closed position and the open position. At this point, the passive pressure oscillation assembly 44a has been triggered to switch from the normal mode to the oscillatory mode.

In particular, the biasing force applied by the restoring spring 70 to the valve disk 66, the opposing force applied by the fluid in the inlet channel 60 to the valve disk 66, and the mass of the valve disk 66 are selected, such that the valve disk 66 oscillates between the closed position and the open position at a predetermined frequency (e.g., in the range of 0.2 Hz-10 Hz). Preferably, the predetermined frequency is less than the natural frequency of the catheter 12, which are flexible, and as such, is susceptible to compressive shortening and lengthening upon pressure cycling. Thus, the predetermined frequency should not correspond to the natural frequency of the catheter 12, which may otherwise cause the catheter 12 to act in a spring-like axial compression/decompression mode.

That is, when the valve disk 66 initially reaches the fully open position, the opposing force applied to the valve disk 66 by the fluid flowing from the inlet channel 60, through the valve seat 64, and into the enlarged flow cavity 68, drops to a level, such that the biasing force applied by the restoring spring 70 overcomes the opposing fluid force applied to the valve disk 66 and the momentum of the valve disk 66. As a result, the valve disk 66 is displaced from the open position back into the closed position within the valve seat 64 (see FIG. 8A). At this point, the momentary flow of fluid from the pressurized fluid source 16 into the aspiration flow path 46 (via the inlet port 50, inlet channel 60, valve seat 64, enlarged flow cavity 68, outlet channel 62, and outlet port 52), has caused the negative pressure differential between inlet port 50 and the outlet port 52 to increase. However, because the valve disk 66 is now in a closed position, thereby preventing the flow of fluid from the pressurized fluid source 16 to the aspiration flow path 46, the negative pressure differential between inlet port 50 and the outlet port 52 decreases until it reaches the negative activation pressure differential, causing the opposing force applied to the valve disk 66 by the fluid in the inlet channel 60 to rise to a level that overcomes the biasing force applied by the restoring spring 70 to the valve disk 66. As a result, the valve disk 66 is displaced from the closed position back to the open position (see FIG. 8B). The valve disk 66 continues to alternately be displaced between the closed position (see FIG. 8A) and the open position (see FIG. 8B) in this manner until the clog is removed from the aspiration conduit 24 of the aspiration catheter 12 or otherwise the anomaly in the aspiration circuit of the system 10 is resolved.

The frequency at which the valve disk 66 oscillates depends on the mass of the valve disk 66 (the frequency of the oscillation decreases as the mass of the valve disk 66 increases), the spring constant of the restoring spring 70 (the frequency of the oscillation increases as the spring constant of the restoring spring 70 increases), and the length of the valve seat 64 (the frequency of the oscillation increases as the length of the valve seat 64 decreases), as well as the dampening effect of the friction between the valve seat 64 and the valve disk 66 and the dynamic forces of the fluid flowing from the inlet channel 60, through the valve seat 64, and into the enlarged flow cavity 68, on the valve disk 66 (the frequency of the oscillation decreases as the dampening effect increases). Thus, the frequency at which the valve disk 66 oscillates (i.e., the resonance of the passive pressure oscillation assembly 44a) may be selected by judicially selecting the mass of the valve disk 66, spring constant of the restoring spring 70, length of the valve seat 64, and pre-compression length of the spring 70, with due regard to the dampening effect that the friction between the valve seat 64 and the valve disk 66 and the fluid flow associated pressure drop from the inlet channel 60, through the valve seat 64, and into the enlarged flow cavity 68, has on the valve disk 66. Such dampening effect, itself, may be adjusted by varying the designed sizes and geometries of the inlet port 50, outlet port 52, inlet channel 60, and outlet channel 62.

In response to removal of the clog in the aspiration conduit 24 of the aspiration catheter 12, or otherwise the resolution of the anomaly in the aspiration circuit of the system 10, the absolute pressure in the aspiration flow path 46 increases to a level that creates a negative cessation pressure differential between the inlet port 50 (and thus the inlet channel 60) and the outlet port 52 (and thus the enlarged flow cavity 68), which prevents the fluid in the inlet channel 60 from applying an opposing force to the valve disk 66 that overcomes the biasing force applied by the restoring spring 70 to the valve disk 66. That is, when the valve disk 66 is in the closed position, the negative pressure differential between inlet port 50 and the outlet port 52 will never drop below the negative activation pressure differential due to the free flow condition of the aspiration flow path 46. As a result, the biasing force applied by the restoring spring 70 maintains the valve disk 66 in the closed position. At this point, the passive pressure oscillation assembly 44a has been triggered to switch from the oscillatory mode back to the normal mode.

It should be noted that the passive pressure oscillation assembly 44a illustrated in FIGS. 8A and 8B topologically comprises a pressure actuated valve 54 and a fluid resonator 56 (shown in FIG. 5) that are mechanically coupled to each other. That is, the valve seat 64 and movable valve disk 66 form the pressure actuated valve 54, whereas the valve disk 66, enlarged flow cavity 68, and restoring spring 70 form the fluid resonator 56, with the pressure actuated valve 54 and fluid resonator 56 being mechanically coupled to each other via the valve disk 66. In this embodiment, because the valve disk 66 forms a portion of both the pressure actuated valve 54 and the fluid resonator 56, the negative activation and cessation pressure differentials and the resonance frequency must be designed with due regard to each other, and thus, may not be able to be independently optimized, although the resulting design of the passive pressure oscillation assembly 44a may be mechanically simple.

Figure 9A:
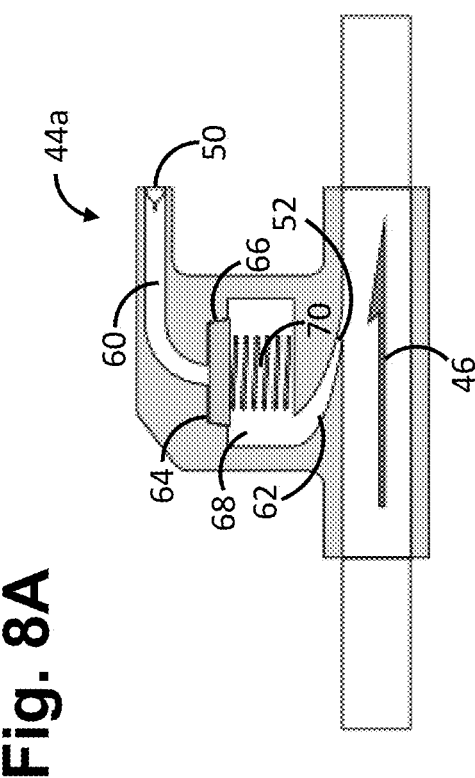
FIG. 9A is a plan view of another embodiment of a passive pressure oscillation assembly used in the aspiration system of FIG. 1, particularly showing the passive pressure oscillation assembly in a closed position.
Figure 9B:
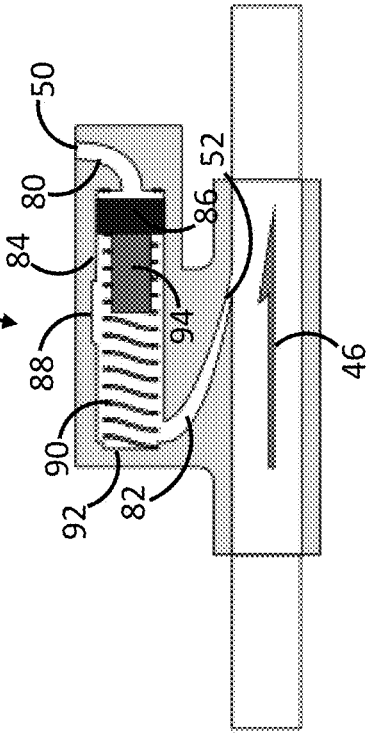
FIG. 9B is a plan view of the passive pressure oscillation assembly of FIG. 9A, particularly showing the passive pressure oscillation assembly in an open position.

Referring now to FIGS. 9A and 9B, another embodiment of a passive pressure oscillation assembly 44b will be described. The passive pressure oscillation assembly 44b is similar to the passive pressure oscillation assembly 44a illustrated in FIGS. 8A and 8B, with the exception that the passive pressure oscillation assembly 44b comprises a long valve seal relative to the movable valve element in which it interacts, such that its resonant frequency is much slower than that of the passive pressure oscillation assembly 44a.

In particular, passive pressure oscillation assembly 44b comprises an inlet channel 80 fluidly coupled to the pressurized fluid source 16 via the inlet port 50, and an outlet channel 82 fluidly coupled to the aspiration flow path 46 via the outlet port 52. The passive pressure oscillation assembly 44b further comprises a valve seal in the form of a valve cylinder 84 fluidly coupled to the inlet port 50 via the inlet channel 80, a movable valve element in the form of a valve disk 86 operatively associated with the valve cylinder 84, and an enlarged flow cavity 88 fluidly coupled between the valve cylinder 84 and the aspiration flow path 46 via the outlet channel 62 and outlet port 52. The valve disk 86 is configured for being alternately displaced between a closed position to seal within the valve cylinder 84 (see FIG. 9A), and an open position residing within the enlarged flow cavity 88 (see FIG. 9B). The passive pressure oscillation assembly 44b further comprises a restoring spring 90 disposed in a spring cavity 92 between the enlarged flow cavity 88 and the outlet channel 82, and mechanically coupled to the valve disk 86 via a boss 94 affixed to the valve disk 86 for applying a biasing force to the valve disk 86 in a manner that maintains the valve disk 86 into the closed position within the valve cylinder 84 until the passive pressure oscillation assembly 44b is triggered to switch from the normal mode to the oscillatory mode.

The valve disk 86 and valve cylinder 84 have the same geometric profile (in this case, a cylindrical in nature), such that the valve disk 86, when in the closed position within the valve cylinder 84 (see FIG. 9A), seals against the valve cylinder 84 to prevent the flow of fluid originating from the pressurized fluid source 16 (in this case, fluid that has been introduced into the inlet channel 80 via the inlet port 50) into the enlarged flow cavity 88. The enlarged flow cavity 88 has a geometric profile that is larger than the geometric profile of the valve disk 86, such that the valve disk 86, when in the open position outside of the valve cylinder 84 and within the enlarged flow cavity 88 (see FIG. 9B), allows the flow of fluid originating from pressurized fluid source 16 (in this case, fluid that has been introduced into the inlet channel 80 via the inlet port 50), into the enlarged flow cavity 88, through the outlet channel 82, and into the aspiration flow path 46 via the outlet port 52.

In response to a clog in the aspiration conduit 24 of the aspiration catheter 12, or otherwise the occurrence of an anomaly in the aspiration circuit of the system 10, a no-flow or low-flow condition occurs in the aspiration flow path 46, and as a result, the absolute pressure in the aspiration flow path 46 drops to a level that creates a negative activation pressure differential between the inlet port 50 (and thus the valve cylinder 84) and the outlet port 52 (and thus the enlarged flow cavity 88), which causes the fluid in the inlet channel 80 to apply an opposing force to the valve disk 86 that overcomes the biasing force applied by the restoring spring 90 to the valve disk 86. As a result, the valve disk 86 is displaced from the closed position (see FIG. 9A) to the open position (see FIG. 9B). The negative activation pressure differential of the passive pressure oscillation assembly 44b will be based on the area of the valve disk 86 exposed to the fluid in the valve cylinder 84 (the negative activation pressure differential will decrease in proportion to the exposed area of the valve disk 86) and the spring constant of the restoring spring 90 (the negative action pressure differential will increase in proportion to the spring constant of the restoring spring 90). Thus, the negative activation pressure differential of the passive pressure oscillation assembly 44b may be selected by judicially selecting the exposed area of the valve disk 86 and the spring constant of the restoring spring 90.

The passive pressure oscillation assembly 44b is designed in such a manner that, once the valve disk 86 is displaced from the closed position to the open position (i.e., the valve "cracks"), the passive pressure oscillation assembly 44b resonates (i.e., the valve disk 86 alternately switches (oscillates) between the closed position and the open position. At this point, the passive pressure oscillation assembly 44*b* has been triggered to switch from the normal mode to the oscillatory mode.

In particular, the biasing force applied by the restoring spring 90 to the valve disk 86, the opposing force applied by the fluid in the valve cylinder 84, and the mass of the valve disk 86 are selected, such that the valve disk 86 oscillates between the closed position and the open position at a predetermined frequency (e.g., in the range of 0.2 Hz-10 Hz).

That is, when the valve disk 86 fully reaches the open position, the opposing force applied to the valve disk 86 by the fluid flowing from the inlet channel 80, through the valve cylinder 84, and into the enlarged flow cavity 88, drops to a level, such that the biasing force applied by the restoring spring 90 overcomes the opposing fluid force applied to the valve disk 86 and the momentum of the valve disk 86. As a result, the valve disk 86 is displaced from the open position back into the closed position within the valve cylinder 84 (see FIG. 9A). At this point, the momentary flow of fluid from the pressurized fluid source 16 into the aspiration flow path 46 (via the inlet port 50, inlet channel 80, valve cylinder 84, enlarged flow cavity 88, spring cavity 92, outlet channel 82, and outlet port 52), has caused the negative pressure differential between inlet port 50 and the outlet port 52 to increase. However, because the valve disk 86 is now in a closed position, thereby preventing the flow of fluid from the pressurized fluid source 16 to the aspiration flow path 46, the negative pressure differential between inlet port 50 and the outlet port 52 decreases until it reaches the negative activation pressure differential, causing the opposing force applied to the valve disk 86 by the fluid in the valve cylinder 84 to rise to a level that overcomes the biasing force applied by the restoring spring 90 to the valve disk 86. As a result, the valve disk 86 is again displaced from the closed position to the open position (see FIG. 9B). The valve disk 86 continues to alternately be displaced between the closed position (see FIG. 9A) and the open position (see FIG. 9B) in this manner until the clog is removed from the aspiration catheter 12 or otherwise the anomaly in the aspiration circuit of the system 10 is resolved.

The frequency at which the valve disk 86 oscillates depends on the mass of the valve disk 86 (the frequency of the oscillation decreases as the mass of the valve disk 86 increases), the spring constant of the restoring spring 90 (the frequency of the oscillation increases as the spring constant of the restoring spring 90 increases), and the length of the valve cylinder 84 (the frequency of the oscillation increases as the length of the valve seat 64 decreases), as well as the dampening effect of the friction between the valve cylinder 84 and the valve disk 86 and the dynamic forces of the fluid flowing from the inlet channel 60, through the valve cylinder 84, and into the enlarged flow cavity 88, on the valve disk 86 (the frequency of the oscillation decreases as the dampening effect increases). Thus, frequency at which the valve disk 86 oscillates (i.e., the resonance of the passive pressure oscillation assembly 44*b*) may be selected by judicially selecting the mass of the valve disk 86 and the spring constant of the restoring spring 90, length of the valve cylinder 84, and pre-compression length of the spring 90, with due regard to the dampening effect that the friction between the valve cylinder 84 and the valve disk 86 and the fluid flowing from the inlet channel 80, through the valve cylinder 84, and into the enlarged flow cavity 88, has on the valve disk 86. Such dampening effect, itself, may be adjusted by varying the designed sizes and geometries of the inlet port 50, outlet port 52, inlet channel 80, and outlet channel 82.

In response to removal of the clog in the aspiration conduit 24 of the aspiration catheter 12, or otherwise the resolution of the anomaly in the aspiration circuit of the system 10, the absolute pressure in the aspiration flow path 46 increases to a level that creates a negative activation pressure differential between the inlet port 50 (and thus the valve cylinder 84) and the outlet port 52 (and thus the enlarged flow cavity 88), which prevents the fluid in the inlet channel 80 from applying an opposing force to the valve disk 86 that overcomes the biasing force applied by the restoring spring 90 to the valve disk 86. That is, when the movable valve cylinder 86 is in the closed position, the negative pressure differential between inlet port 50 and the outlet port 52 will never drop below the negative activation pressure differential due to the free flow condition of the aspiration flow path 46. As a result, the biasing force applied by the restoring spring 90 maintains the valve disk 86 in the closed position. At this point, the passive pressure oscillation assembly 44*b* has been triggered to switch from the oscillatory mode to the normal mode.

It should be noted that the passive pressure oscillation assembly 44*b* illustrated in FIGS. 9A and 9B topologically comprises a pressure actuated valve 54 and a fluid resonator 56 (shown in FIG. 5) that are mechanically coupled to each other. That is, the valve cylinder 84 and valve disk 86 form the pressure actuated valve 54, whereas the valve disk 86, enlarged flow cavity 88, and restoring spring 90 form the fluid resonator 56, with the pressure actuated valve 54 and fluid resonator 56 being mechanically coupled to each other via the valve disk 86. In this embodiment, because the valve disk 86 forms a portion of both the pressure actuated valve 54 and the fluid resonator 56, the negative activation and cessation pressure differentials and the resonance frequency must be designed with due regard to each other, and thus, may not be able to be independently optimized, although the resulting design of the passive pressure oscillation assembly 44*b* may be mechanically simple.

Referring now to FIGS. 10A-10D, still another embodiment of a passive pressure oscillation assembly 44*c* will be described. The passive pressure oscillation assembly 44*c* is similar to the passive pressure oscillation assembly 44*a* illustrated in FIGS. 6A and 6B, with the exception that the passive pressure oscillation assembly 44*c* comprises an additional oscillation enhancement mechanism that ensures that the passive pressure oscillation assembly 44*c* remains in the oscillatory mode as long as the clog in the aspiration conduit 24 of the aspiration catheter 12 remains, or otherwise the anomaly in the aspiration circuit of the system 10 is not resolved.

The passive pressure oscillation assembly 44*c* comprises an inlet channel 100 fluidly coupled to the pressurized fluid source 16 via the inlet port 50, and an outlet channel 102 fluidly coupled to the aspiration flow path 46 via the outlet port 52. The passive pressure oscillation assembly 44*c* further comprises a valve seal in the form of a seat 104, a movable valve element in the form of a valve disk 106 operably associated with the valve seat 104, and an enlarged flow cavity 108 that fluidly couples the valve seat 104 to the aspiration flow path 46 via the outlet channel 102 and outlet port 52. The valve disk 106 is configured for being alternately displaced between a closed position to seal against the valve seat 104, and in this case, within the valve seat 104 (see FIGS. 10A and 10D), and an open position away from the valve seat 104, and in this case outside of the valve seat 104 (see FIGS. 10B and 10C). The passive pressure oscillation assembly 44c further comprises a restoring spring 110 disposed in the enlarged flow cavity 108 and mechanically coupled to the valve disk 106 for applying a biasing force to the valve disk 106 in a manner that maintains the valve disk 106 into the closed position within the valve seat 104 until the passive pressure oscillation assembly 44c is triggered to switch from the normal mode to the oscillatory mode.

The passive pressure oscillation assembly 44c further comprises a plunger cavity 114, a plunger head 116 slidably disposed within the plunger cavity 114, a reduced profile center cavity 118, a plunger stop 120 disposed between the plunger cavity 114 and the reduced profile center cavity 118, and another restoring spring 122 mechanically coupled to the plunger head 116 via a boss 124 affixed to the plunger head 116 for applying a biasing force to the plunger head 116 to maintain the plunger head 116 away from the plunger stop 120. In the illustrated embodiment, the profile of the reduced profile center cavity 118 is smaller than the profile of the plunger cavity 114, such that the plunger stop 120 is formed by the wall of the plunger cavity 114 adjacent the reduced profile center cavity 118. The plunger head 116 has a fluid pressure equalization channel 126 extending through the plunger head 116. The plunger cavity 114 is fluidly coupled between the valve seat 104 and the plunger cavity 114, such that the valve seat 104 is always in fluid communication with the inlet port 50 via the fluid pressure equalization channel 126 extending through the plunger head 116, and fluid originating from the pressurized fluid source 16 can flow into the reduced profile center cavity 118. Thus, the fluid pressure equalization channel 126 extending through the plunger head 116 serves to equalize the pressure between the pressurized fluid source 16 and the reduced profile center cavity 118.

The valve disk 106 and valve seat 104 have the same geometric profile (in this case, a flattened trapezoidal shape cross-section), such that the valve disk 106, when in the closed position within the valve seat 104 (see FIGS. 10A and 10D), prevents the flow of fluid originating from the pressurized fluid source 16 (in this case, fluid that has been introduced into the reduced profile center cavity 118 from the inlet channel 100 via the inlet port 50, and through the fluid pressure equalization channel 126 of the plunger head 116) into the enlarged flow cavity 108. The enlarged flow cavity 108 has a geometric profile that is larger than the geometric profile of the valve disk 106, such that the valve disk 106, when in the open position outside of the valve seat 104 and inside the enlarged flow cavity 108 (see FIGS. 10B and 10C), allows the flow of fluid originating from pressurized fluid source 16 (in this case, fluid that has been introduced into plunger cavity 114 from the inlet port 50 and the inlet channel 100 via the fluid pressure equalization channel 126), into the enlarged flow cavity 108, through the outlet channel 102, and into the aspiration flow path 46 via the outlet port 52. The plunger head 116 and plunger cavity 114 have the same geometric profile (in this case, a cylindrical in nature), such fluid from the pressurized fluid source 16 can only enter the reduced profile center cavity 118 via the fluid pressure equalization channel 126 of the plunger head 116.

In response to a clog in the aspiration conduit 24 of the aspiration catheter 12, or otherwise the occurrence of an anomaly in the aspiration circuit of the system 10, a no-flow or low-flow condition occurs in the aspiration flow path 46, and as a result, the absolute pressure in the aspiration flow path 46 drops to a level that creates a negative activation pressure differential between the inlet port 50 (and thus the reduced profile center cavity 118) and the outlet port 52 (and thus the enlarged flow cavity 108), which causes the fluid in the plunger cavity 114, and thus reduced profile center cavity 118, to apply an opposing force to the valve disk 106 that overcomes the biasing force applied by the restoring spring 110 to the valve disk 106. As a result, the valve disk 106 is displaced from the closed position (see FIG. 10A) to the open position (see FIG. 10B). The negative activation pressure differential of the passive pressure oscillation assembly 44c will be based on the area of the valve disk 106 exposed to the fluid in the inlet channel 100 (the negative activation pressure differential will decrease in proportion to the exposed area of the valve disk 106) and the spring constant of the restoring spring 110 (the negative action pressure differential will increase in proportion to the spring constant of the restoring spring 110). Thus, the negative activation pressure differential of the passive pressure oscillation assembly 44c may be selected by judicially selecting the exposed area of the valve disk 106 and the spring constant of the restoring spring 110.

The passive pressure oscillation assembly 44c is designed in such a manner that, once the valve disk 106 is displaced from the closed position to the open position (i.e., the valve "cracks"), the passive pressure oscillation assembly 44c resonates (i.e., the valve disk 106 alternately switches (oscillates) between the closed position and the open position. At this point, the passive pressure oscillation assembly 44c has been triggered to switch from the normal mode to the oscillatory mode.

In particular, the biasing force applied by the restoring spring 110 to the valve disk 106, the opposing force applied by the fluid in the reduced profile center cavity 118 to the valve disk 106, and mass of the valve disk 106 are selected, such that the valve disk 106 oscillates between the closed position and the open position at a predetermined frequency. Furthermore, dynamic displacement of the plunger head 116 within the plunger cavity 114 ensures that the valve disk 106 does not get stuck in the open position as the fluid flowing from the reduced profile center cavity 118 into the enlarged flow cavity 108 applies a force to the valve disk 106.

In particular, as the valve disk 106 is displaced from the closed position to the open position (see FIG. 10C), fluid flows from the plunger cavity 114 in front of the plunger head 116, through the reduced profile center cavity 118, through the valve seat 104, and into the enlarged flow cavity 108, causing the plunger head 116 to be displaced within the plunger cavity 114 towards the reduced profile center cavity 118 until the plunger head 116 abuts the plunger stop 120, and additional fluid to flow from the pressurized fluid source 16 into the plunger cavity 114 behind the plunger head 116 via the inlet port 50 and inlet channel 100. Once the plunger head 116 abuts the plunger stop 120, the flow of fluid from the reduced profile center cavity 118, through the valve seat 104, and into the enlarged flow cavity 108 is greatly diminished, limited to the flow of fluid through the fluid pressure equalization channel 126 through the plunger head 116. Thus, the opposing force applied to the valve disk 106 by the fluid flowing from the reduced profile center cavity 118, through the valve seat 104, and into the enlarged flow cavity 108, drops to a level, such that the biasing force applied by the restoring spring 110 overcomes the opposing fluid force applied to the valve disk 106 and the momentum of the valve disk 106. As a result, the valve disk 106 is displaced from the open position back into the closed position within the valve seat 104 (see FIG. 10D). The fluid pressure between the reduced profile center cavity 118 and the plunger cavity 114 equalizes via the fluid pressure equalization channel 126 through the plunger head 116, thereby dropping the opposing force applied to the plunger head 116 by the fluid in the plunger cavity 114 to a level, such that the biasing force applied by the restoring spring 122 overcomes the opposing fluid force applied to the plunger head 116 and the momentum of the plunger head 116. As a result, the plunger head 116 is displaced within the plunger cavity 114 away from the plunger stop 120, and returns to its neutral position (see FIG. 10A). In this manner, in contrast to the passive pressure oscillation assembly 44a illustrated in FIGS. 8A-8B, as well as the passive pressure oscillation assembly 44a illustrated in FIGS. 9A-9B, where fluid flows through the valve seat unimpeded, which under certain circumstances, may cause the valve disk to remain open, thereby preventing oscillation of the valve seat between the closed and open positions, the action of the plunger head 116 within the plunger cavity 114 prevents the valve disk 106 from "sticking" in the open position by greatly diminishing the flow of fluid through the valve seat 104 that might otherwise prevent the valve disk 106 to revert back to its closed position within the valve seat 104.

The frequency at which the valve disk 106 oscillates depends on the frequency at which the plunger head 116 oscillates within the plunger cavity 114, which in turn, depends on the mass of the plunger head 116 (the frequency of the oscillation decreases as the mass of the plunger head 116 increases), the spring constant of the restoring spring 122 (the frequency of the oscillation increases as the spring constant of the restoring spring 122 increases), the diameter of the equalization channel 126, and the dampening effect of the friction between the plunger cavity 114 and the plunger head 116, as well as dynamic forces of the fluid within the plunger cavity 114, including the fluid flowing through the channel fluid pressure equalization channel 126 of the plunger head 116 during equalization of the fluid pressure in the plunger cavity 114 (the frequency of the oscillation decreases as the dampening effect increases). Thus, frequency at which the valve disk 106 oscillates (i.e., the resonance of the passive pressure oscillation assembly 44c) may be selected by judicially selecting the mass of the plunger head 116 and the spring constant of the restoring spring 122, and the diameter of the equalization channel 126, with due regard to the dampening effect that the friction between the plunger cavity 114 and the plunger head 116, and the dynamics of the fluid within the reduced profile center cavity 118, have on the plunger head 116. Such dampening effect, itself, may be adjusted by varying the designed size of the inlet port 50, outlet port 52, inlet channel 100, and outlet channel 102.

In response to removal of the clog in the aspiration conduit 24 of the aspiration catheter 12, or otherwise the resolution of the anomaly in the aspiration circuit of the system 10, the absolute pressure in the aspiration flow path 46 increases to a level that creates a negative cessation pressure differential between the inlet port 50 (and thus the inlet channel 100) and the outlet port 52 (and thus the enlarged flow cavity 108), which prevents the fluid in the reduced profile center cavity 118 from applying an opposing force to the valve disk 106 that overcomes the biasing force applied by the spring 100 to the valve disk 106. That is, when the valve disk 106 is in the closed position, the negative pressure differential between inlet port 50 and the outlet port 52 will never drop below the negative activation pressure differential due to the free flow condition of the aspiration flow path 46. As a result, the biasing force applied by the restoring spring 110 maintains the valve disk 106 in the closed position. At this point, the passive pressure oscillation assembly 44c has been triggered to switch from the oscillatory mode to the normal mode.

Although the movable valve elements in the passive pressure oscillation assemblies 44a-44c illustrated in FIGS. 8-10 have been described as being valve disks, it should be appreciated that the movable valve elements may have any suitable form that can be operatively associated with a corresponding valve seal for alternately allowing and preventing the flow of fluid originating from the pressurized fluid source 16 therethrough. For example, with reference to FIGS. 11A and 11B, an alternative embodiment of a passive pressure oscillation assembly 44d is similar to the passive pressure oscillation assembly 44a of FIGS. 8A-8B, with the exception that the movable valve element takes the form of a ball.

In particular, the passive pressure oscillation assembly 44d comprises a comprises an inlet channel 130 fluidly coupled to the pressurized fluid source 16 via the inlet port 50, and an outlet channel 132 fluidly coupled to the aspiration flow path 46 via the outlet port 52. The passive pressure oscillation assembly 44d further comprises a valve seal in the form of a seat 134 fluidly coupled to the inlet port 50 via the inlet channel 130, a movable valve element in the form of a valve ball 136 operably associated with the valve seat 134, and an enlarged flow cavity 138 fluidly coupled between the valve seat 134 and the aspiration flow path 46 via the outlet channel 132 and outlet port 52. The valve ball 136 is configured for being alternately displaced between a closed position to seal against the valve seat 134 (see FIG. 11A), and an open position away from the valve seat 64, and in this case outside of the valve seat 64 (see FIG. 11B). The passive pressure oscillation assembly 44d further comprises a spring 140 affixed within the enlarged flow cavity 138 and mechanically coupled to the valve ball 136 for applying a biasing force to the valve ball 136 in a manner that maintains the valve ball 136 in the closed position against valve seat 134 until the passive pressure oscillation assembly 44d is triggered to switch from the normal mode to the oscillatory mode, as will be described in further detail below.

The surface of the valve seat 134 that contacts the valve ball 136 preferably has a spherical profile, such that the valve ball 136, when in the closed position against the valve seat 134 (see FIG. 11A), seals against the valve seat 134 to prevent the flow of fluid originating from the pressurized fluid source 16 (in this case, fluid that has been introduced into the inlet channel 130 via the inlet port 50) into the enlarged flow cavity 138. The enlarged flow cavity 138 has a geometric profile that is larger than the geometric profile of the valve ball 136, such that the valve ball 136, when in the open position away from the valve seat 134 and within the enlarged flow cavity 138 (see FIG. 11B), allows the flow of fluid originating from pressurized fluid source 16 (in this case, fluid that has been introduced into the inlet channel 130 via the inlet port 50), into the enlarged flow cavity 138, through the outlet channel 132, and into the aspiration flow path 46 via the outlet port 52.

In response to a clog in the aspiration conduit 24 of the aspiration catheter 12, or otherwise the occurrence of an anomaly in the aspiration circuit of the system 10, a no-flow or low-flow condition occurs in the aspiration flow path 46, and as a result, the absolute pressure in the aspiration flow path 46 drops to a level that creates a negative activation pressure differential between the inlet port 50 (and thus the inlet channel 130) and the outlet port 52 (and thus the enlarged flow cavity 138), which causes the fluid in the inlet channel 130 to apply an opposing force to the valve ball 136 that overcomes the biasing force applied by the spring 140 to the valve ball 136. As a result, the valve ball 136 is displaced from the closed position (see FIG. 11A) to the open position (see FIG. 11B). The negative activation pressure differential of the passive pressure oscillation assembly 44d will be based on the area of the valve ball 136 exposed to the fluid in the inlet channel 130 (the negative activation pressure differential will decrease in proportion to the exposed area of the valve ball 136) and the spring constant of the spring 140 (the negative action pressure differential will increase in proportion to the spring constant of the spring 140). Thus, the negative activation pressure differential of the passive pressure oscillation assembly 44d may be selected by judicially selecting the exposed area of the valve ball 136 and the spring constant of the spring 140.

The passive pressure oscillation assembly 44d is designed in such a manner that, once the valve ball 136 is displaced from the closed position to the open position (i.e., the valve "cracks"), the passive pressure oscillation assembly 44d resonates (i.e., the valve ball 136 alternately switches (oscillates) between the closed position and the open position. At this point, the passive pressure oscillation assembly 44d has been triggered to switch from the normal mode to the oscillatory mode.

In particular, the biasing force applied by the spring 140 to the valve ball 136, the opposing force applied by the fluid in the inlet channel 130 to the valve ball 136, and the mass of the valve ball 136 are selected, such that the valve ball 136 oscillates between the closed position and the open position at a predetermined frequency (e.g., 0.2 Hz-10 Hz).

That is, when the valve ball 136 initially reaches the fully open position, the opposing force applied to the valve ball 136 by the fluid flowing from the inlet channel 60, through the valve seat 134, and into the enlarged flow cavity 138, drops to a level, such that the biasing force applied by the spring 140 overcomes the opposing fluid force applied to the valve ball 136 and the momentum of the valve ball 136. As a result, the valve ball 136 is displaced from the open position back into the closed position within the valve seat 134 (see FIG. 11A). At this point, the momentary flow of fluid from the pressurized fluid source 16 into the aspiration flow path 46 (via the inlet port 50, inlet channel 130, valve seat 134, enlarged flow cavity 138, outlet channel 132, and outlet port 52), has caused the negative pressure differential between inlet port 50 and the outlet port 52 to increase. However, because the valve ball 136 is now in a closed position, thereby preventing the flow of fluid from the pressurized fluid source 16 to the aspiration flow path 46, the negative pressure differential between inlet port 50 and the outlet port 52 decreases until it reaches the negative activation pressure differential, causing the opposing force applied to the valve ball 136 by the fluid in the inlet channel 60 to rise to a level that overcomes the biasing force applied by the spring 140 to the valve ball 136. As a result, the valve ball 136 is displaced from the closed position back to the open position (see FIG. 11B). The valve ball 136 continues to alternately be displaced between the closed position (see FIG. 11A) and the open position (see FIG. 11B) in this manner until the clog is removed from the aspiration conduit 24 of the aspiration catheter 12 or otherwise the anomaly in the aspiration circuit of the system 10 is resolved.

The frequency at which the valve ball 136 oscillates depends on the mass of the valve ball 136 (the frequency of the oscillation decreases as the mass of the valve ball 136 increases), and the spring constant of the spring 140 (the frequency of the oscillation increases as the spring constant of the spring 140 increases), as well as the dampening effect of the dynamic forces of the fluid flowing from the inlet channel 130, through the valve seat 134, and into the enlarged flow cavity 138, on the valve ball 136 (the frequency of the oscillation decreases as the dampening effect increases). Thus, the frequency at which the valve ball 136 oscillates (i.e., the resonance of the passive pressure oscillation assembly 44a) may be selected by judicially selecting the mass of the valve ball 136, spring constant of the spring 140, length of the valve seat 134, and pre-compression length of the spring 140, with due regard to the dampening effect that the fluid flowing from the inlet channel 130, through the valve seat 134, and into the enlarged flow cavity 138, has on the valve ball 136. Such dampening effect, itself, may be adjusted by varying the designed sizes and geometries of the inlet port 50, outlet port 52, inlet channel 130, and outlet channel 132.

In response to removal of the clog in the aspiration conduit 24 of the aspiration catheter 12, or otherwise the resolution of the anomaly in the aspiration circuit of the system 10, the absolute pressure in the aspiration flow path 46 increases to a level that creates a negative cessation pressure differential between the inlet port 50 (and thus the inlet channel 130) and the outlet port 52 (and thus the enlarged flow cavity 138), which prevents the fluid in the inlet channel 130 from applying an opposing force to the valve ball 136 that overcomes the biasing force applied by the spring 140 to the valve ball 136. That is, when the valve ball 136 is in the closed position, the negative pressure differential between inlet port 50 and the outlet port 52 will never drop below the negative activation pressure differential due to the free flow condition of the aspiration flow path 46. As a result, the biasing force applied by the spring 140 maintains the valve ball 136 in the closed position. At this point, the passive pressure oscillation assembly 44d has been triggered to switch from the oscillatory mode back to the normal mode.

Figure 11B:
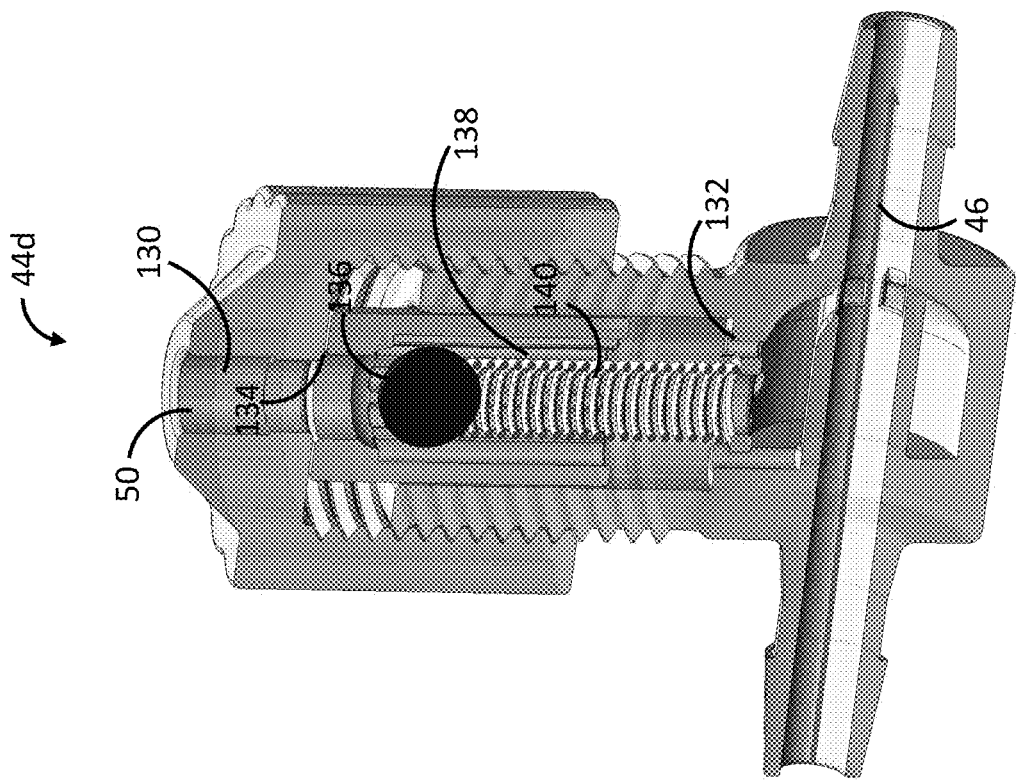
FIG. 11B is a plan view of the passive pressure oscillation assembly of FIG. 11A, particularly showing the passive pressure oscillation assembly in an open position.
Figure 11A:
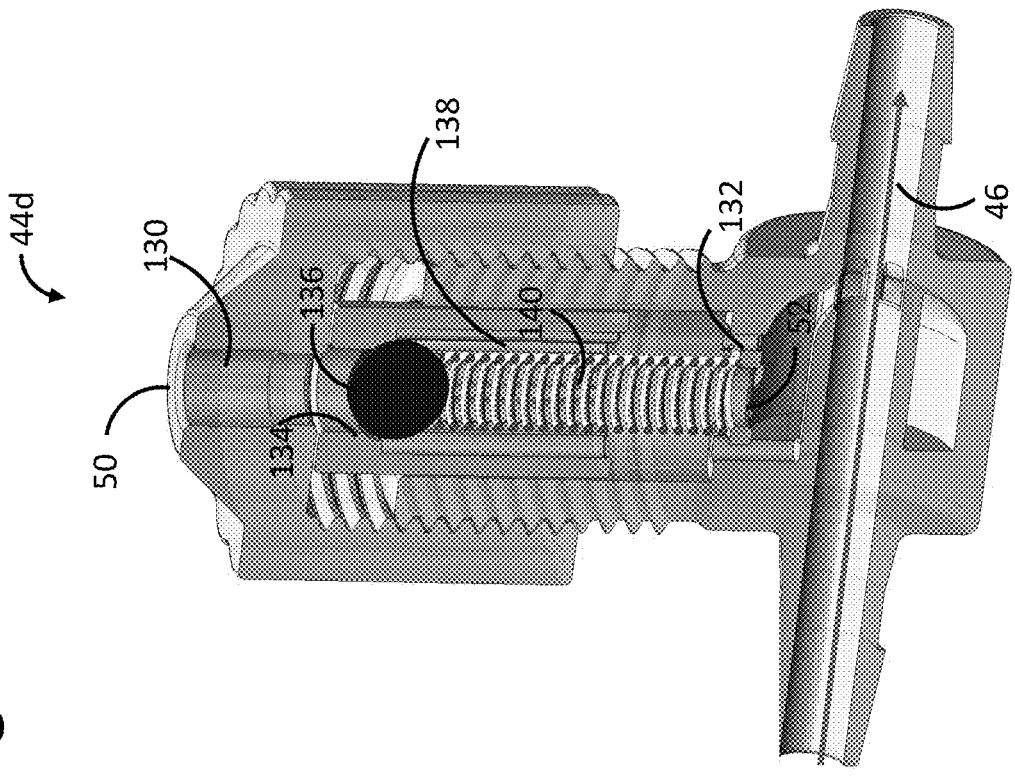
FIG. 11A is a plan view of another embodiment of a passive pressure oscillation assembly used in the aspiration system of FIG. 1, particularly showing the passive pressure oscillation assembly in a closed position.

It should be noted that the passive pressure oscillation assembly 44d illustrated in FIGS. 11A and 11B topologically comprises a pressure actuated valve 54 and a fluid resonator 56 (shown in FIG. 5) that are mechanically coupled to each other. That is, the valve seat 134 and movable valve ball 136 form the pressure actuated valve 54, whereas the valve ball 136, enlarged flow cavity 138, and spring 140 form the fluid resonator 56, with the pressure actuated valve 54 and fluid resonator 56 being mechanically coupled to each other via the valve ball 136. In this embodiment, because the valve ball 136 forms a portion of both the pressure actuated valve 54 and the fluid resonator 56, the negative activation and cessation pressure differentials and the resonance frequency must be designed with due regard to each other, and thus, may not be able to be independently optimized, although the resulting design of the passive pressure oscillation assembly 44d may be mechanically simple.

Figure 12:
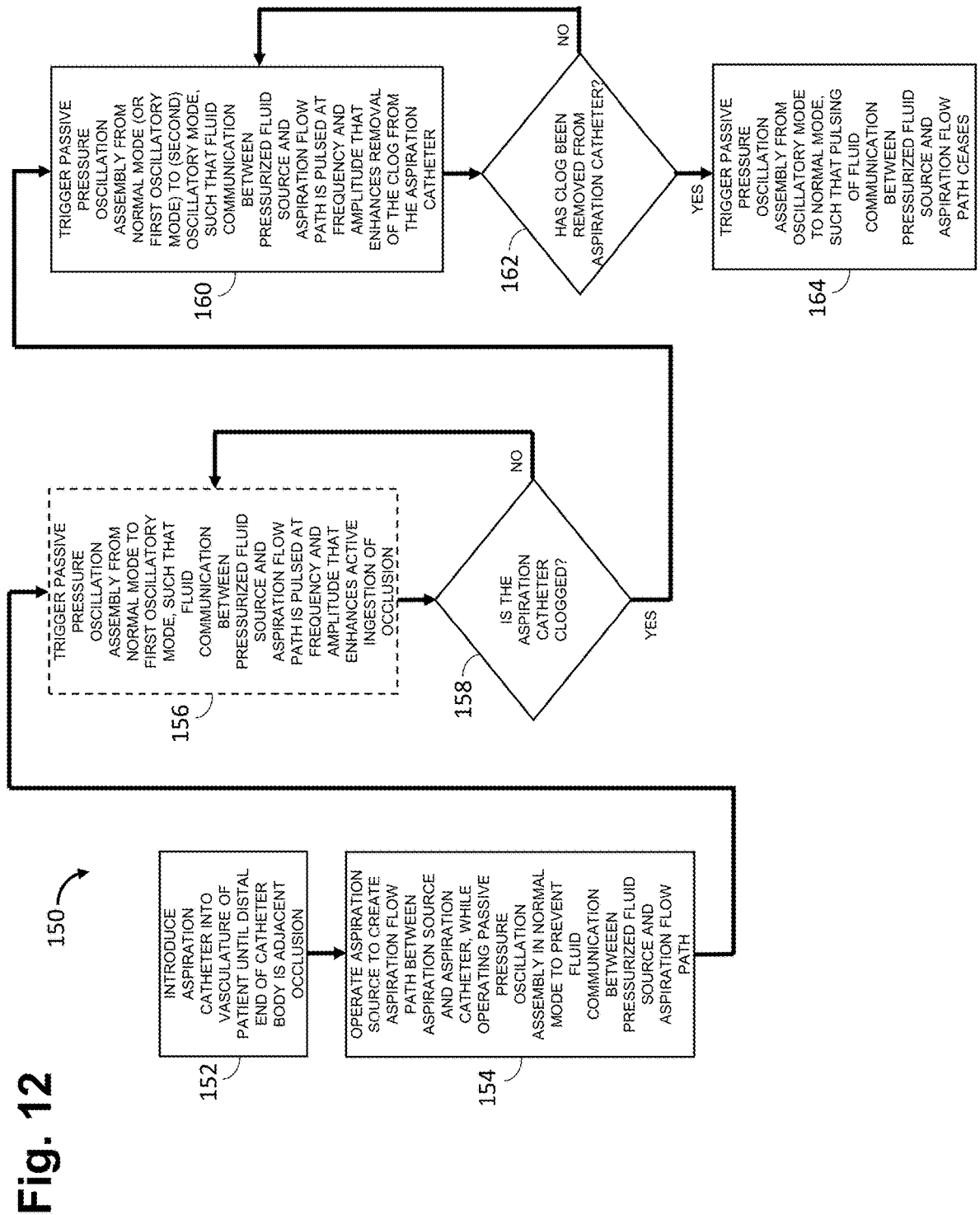
FIG. 12 is a flow diagram illustrating one method of operating the aspiration system of FIG. 1 to aspirate an occlusion from the vasculature of a patient.

Referring now to FIG. 12, one method 150 of operating the aspiration system 10 to aspirate the occlusion 2 from the vasculature 1 of a patient will be described. The method 150 comprises introducing the aspiration catheter 12 into the vasculature 1 of the patient until the distal end 30 of the catheter body 22 is adjacent the occlusion 2 (step 152). Next, the aspiration source 14 is operated to create an aspiration flow path 46 between the aspiration catheter 12 and the aspiration source 14 to actively ingest the occlusion 2, while operating the passive pressure oscillation assembly 44 in the normal mode to prevent fluid communication between the pressurized fluid source 16 and the aspiration flow path 46 (step 154). Thus, aspiration of the occlusion 2 is performed as efficiently as possible at this point.

Optionally, the passive pressure oscillation assembly 44 is triggered to switch from the normal mode to a first oscillatory mode in response to active ingestion of the occlusion 2 (e.g., if the absolute pressure in the aspiration flow path 46 drops to a level that creates a first negative activation pressure differential between the pressurized fluid source 44 and the aspiration flow path 46 less than −50 kPa), such that fluid communication between the pressurized fluid source 16 and the aspiration flow path 46 is pulsed at a suitable amplitude and frequency that enhances active ingestion of the occlusion 2 (e.g., high frequency, low amplitude) (step 156). The high frequency, low amplitude pulsing of the fluid communication between the pressurized fluid source 16 and the aspiration flow path 46 may minimize disruption to the aspiration flow path 46, such that active ingestion of the occlusion 2 may be as efficient as possible.

Next, if a clog occurs in the aspiration conduit 24 of the aspiration catheter 12 (e.g., if the absolute pressure in the aspiration flow path 46 drops to a level that creates a second negative activation pressure differential between the pressurized fluid source 44 and the aspiration flow path 46 less than −55 kPa) (step 158), the passive pressure oscillation assembly 44 is triggered to switch from the normal mode (or optionally the first oscillatory mode) to the (second) oscillatory mode, such that fluid communication between the pressurized fluid source 16 and the aspiration flow path 46 is pulsed at a suitable amplitude and frequency that enhances clearing of the clog (e.g., low frequency, high amplitude) (step 160). Optionally, the fluid communication between the pressurized fluid source 16 and the aspiration flow path 46 may be pulsed simultaneously at different frequencies. If a clog does not occur in the aspiration conduit 24 of the aspiration catheter 12 (e.g., if the absolute pressure in the aspiration flow path 46 does not drop to a level that creates a second negative activation pressure differential between the pressurized fluid source 44 and the aspiration flow path 46 less than −55 kPa) (step 158), the passive pressure oscillation assembly 44 remains in the normal mode (or optionally in the first oscillatory mode) until the occlusion 2 is fully ingested.

If a clog does occur in the aspiration conduit 24 of the aspiration catheter 12, and such clog has been removed, or otherwise the anomaly in the aspiration circuit of the aspiration system 10 has been resolved (e.g., if the absolute pressure in the aspiration flow path 46 rises to a level that creates a negative cessation pressure differential between the pressurized fluid source 44 and the aspiration flow path 46 that is greater, and preferably 10 kPa-25 kPa greater, than the negative activation pressure differential) (step 162), the passive pressure oscillation assembly 44 is triggered to switch from the oscillatory mode to the normal mode, such that fluid communication between the pressurized fluid source 16 and the aspiration flow path 46 is again prevented, and the aspiration procedure continues (step 164). If a clog does occur in the aspiration conduit 24 of the aspiration catheter 12, and such clog has not been removed, or otherwise the anomaly in the aspiration circuit of the aspiration system 10 has not been resolved (e.g., if the absolute pressure in the aspiration flow path 46 does not rise to a level that creates a negative cessation pressure differential between the pressurized fluid source 44 and the aspiration flow path 46 that is greater, and preferably 10 kPa-25 kPa greater, than the negative activation pressure differential), the passive pressure oscillation assembly 44 remains in the (second) oscillator mode until the occlusion 2 has been removed, or otherwise the anomaly in the aspiration circuit of the aspiration system 10 has been resolved.

Although the cessation pressure differential of the passive pressure oscillation assembly 44, and the variations thereof, have been described as being below the negative activation pressure differential resulting from the free flow condition of the aspiration flow path 46, the cessation pressure differential of one advantageous embodiment of a passive pressure oscillation assembly 244 is above the negative activation pressure differential resulting from the free flow condition of the aspiration flow path 46, as illustrated in FIGS. 13A-13E and 14.

Similar to the passive pressure oscillation assembly 44, the passive pressure oscillation assembly 244 is configured for dynamically loading (i.e., rapidly changing the vacuum level) the aspiration conduit 24 of the aspiration catheter 12 (shown in FIG. 1), and in particular, cyclically loading the aspiration conduit 24 only during the no-flow or low-flow conditions. Like the passive pressure oscillation assembly 44, the passive pressure oscillation assembly 44 accomplishes this without user input and without the use of electronic sensors, may be made to be very compact, such that it can be fitted within manifold 20 will little additional bulk, and may be disabled simply by blocking the relief inlet 40.

Like the passive pressure oscillation assembly 44, the passive pressure oscillation assembly 244 is configured for being operated between a normal mode that prevents fluid communication along a relief path 48 between the pressurized fluid source 16 and the aspiration flow path 46, such that the absolute pressure in the aspiration flow path 46 remains relatively constant and is only acted upon by the aspiration source 14, and an oscillatory mode that pulses fluid communication along the relief path 48 between the pressurized fluid source 16 and the aspiration flow path 46, such that the absolute pressure in the aspiration flow path 46 oscillates within a range of predetermined frequencies. The passive pressure oscillation assembly 244 is configured for being triggered to switch from the normal mode to the oscillatory mode in response to a clog in the aspiration conduit 24 of the aspiration catheter 12 or otherwise a flow anomaly in the aspiration conduit of the system 10, and conversely, for being triggered to switch from the oscillatory mode to the normal mode in response to removal or clearance of the clog from the aspiration conduit 24 of the aspiration catheter 12 or otherwise resolution of the flow anomaly in the aspiration circuit of the system 10. In the illustrated embodiment, fluid communication pulsing between the pressurized fluid source 16 and the aspiration flow path 46 causes pressure pulses to propagate down the aspiration conduit 24 of the aspiration catheter 12 at one or more predetermined frequencies, and as will be described in further below, two predetermined frequencies. Simultaneously, fluid communication pulsing between the pressurized fluid source 16 and the aspiration flow path 46 causes fluid backflows to propagate down the aspiration conduit 24 of the aspiration catheter 12.

Unlike the passive pressure oscillation assembly 44, because the cessation pressure differential of the passive pressure oscillation assembly 244 is above the negative activation pressure differential resulting from the free flow condition of the aspiration flow path 46, the negative cessation pressure differential may be designed to be much greater than the negative activation pressure differential, thereby ultimately increasing the oscillation strength for dislodging the clog from the aspiration conduit 24 of the aspiration catheter 12. For example, whereas the previously described passive pressure oscillation assembly 44, and the variations thereof, may have a negative cessation pressure differential that is 10 kPa-25 kPa greater than the negative activation pressure differential, the passive pressure oscillation assembly 244 may have a negative cessation pressure differential that is 40 kPa-90 kPa greater than the negative activation pressure differential.

The passive pressure oscillation assembly 244 is also configured for being operating in a mixed frequency mode. In particular, the passive pressure oscillation assembly 244 can be operated in an oscillatory mode that pulses fluid communication between the pressurized fluid source 16 and the aspiration flow path 46 concurrently at a first frequency (e.g., in the range of 0.2 Hz-10 Hz) and at a second frequency different from the first frequency (e.g., in the range of 100 Hz-400 Hz). In this manner, the lower frequency oscillation mode of the passive pressure oscillation assembly 244 may exert a relatively constant large force on the thrombus 2 in the aspiration conduit 24 of the aspiration catheter 12, while the high frequency oscillation mode of the passive pressure oscillation assembly may exert a fluctuating small force on the thrombus 2, thereby reducing the friction between the thrombus 2 and the aspiration conduit 24.

The passive pressure oscillation assembly 244 comprises a plunger cavity 254 having a multitude of cavity ports 256 (including an inlet port 256*a*, outlet port 256*b*, bypass ports 256*c*, 256*d*, pressure tap port 256*e*, aspiration shutoff port 256*f*, and pressure equalization port 256*g*) all spaced from each other along a length of the plunger cavity 254, a plunger assembly 258 slidably disposed within the plunger cavity 254, a spring 260 configured for applying a biasing force to the plunger assembly 254, a multitude of channels, including an inlet channel 262, an outlet channel 264, a bypass channel 266, a pressure tap channel 268, an aspiration shutoff channel 270, and a pressure equalization channel 272, all conditionally in fluid communication with the plunger cavity 254 via the multitude of ports 256, a fluid-actuated aspiration shutoff valve 274 disposed within the aspiration flow path 46 between the aspiration source 14 and the pressure tap channel 268, and a fluid resonator 276 disposed in the outlet channel 262.

The plunger assembly 258 includes a rod 278, a first plunger head 280 affixed to the rod 278, and a second plunger head 282 affixed to the rod 278 in a spaced apart relationship with the first plunger head 280, thereby forming a front plunger cavity region 284 in front of the first plunger head 280, a center plunger cavity region 286 between the first plunger head 280 and the second plunger head 282, and a rear plunger cavity region 288 behind the second plunger head 282. As will be described in further detail below, when the passive pressure oscillation assembly 244 is operating in the oscillatory mode, the plunger assembly 258 is configured for being displaced within the plunger cavity 254 between an open position and a closed position to create low-frequency fluid pulses in the aspiration flow patch 46. Thus, the oscillatory mode of the passive pressure oscillation assembly 244 may pulse fluid communication between the pressurized fluid source 16 and the aspiration flow path 46 at a first frequency. For reasons that will be discussed in further detail below, the outer diameter of the second plunger head 282 is greater than the outer diameter of the first plunger head 280. The plunger cavity 254 has a first portion 290 having a first diameter for accommodating the first plunger head 280, and a second portion 292 having a second diameter greater than the first diameter for accommodating the second plunger head 282.

The inlet channel 262 is in fluid communication between the pressurized fluid source 16 and the front plunger cavity region 284 (via the inlet port 256*a* of the plunger cavity 254). The outlet channel 264 is conditionally in fluid communication between the center plunger cavity region 286 (via the outlet cavity port 256*b* of the plunger cavity 254) and the flow aspiration path 46. The bypass channel 266 is conditionally in fluid communication between the front plunger cavity region 284 (via the first bypass port 256*c* of the plunger cavity 254) and the center plunger cavity region 286 (via the second bypass port 256*d* of the plunger cavity 254). The pressure tap channel 268 is in fluid communication between the flow aspiration path 46 and the rear plunger cavity region 288 (via the pressure tap port 256*e* of the plunger cavity 254). The aspiration shutoff channel 270 is conditionally in fluid communication between the center plunger cavity region 286 (via the aspiration shutoff port 256*f* of the plunger cavity 254) and the fluid-actuated valve 274), and conditionally in fluid communication between the rear plunger cavity region 288 (via the aspiration shutoff port 256*f* of the plunger cavity 254) and the fluid-actuated valve 274). The pressure equalization channel 272 is conditionally in fluid communication between the flow aspiration path 46 and the center plunger cavity region 286 (via the pressure equalization port 256*g* of the plunger cavity 254).

When the passive pressure oscillation assembly 244 is operating in the oscillatory mode, the fluid resonator 276 is configured for resonating in response to fluid flowing through the outlet channel 264, thereby creating high frequency fluid pulses in the aspiration flow path 46. Thus, the oscillatory mode of the passive pressure oscillation assembly 244 may pulse fluid communication between the pressurized fluid source 16 and the aspiration flow path 46 at a second frequency concurrently with and different from the first frequency. In the illustrated embodiment, the fluid resonator 276 takes the form of a paddle wheel that spins in response to the flow of fluid through the outlet channel 264, although other types of fluid resonators are contemplated.

When the passive pressure oscillation assembly 244 is operating in the normal mode, the fluid-actuated valve 274 is configured for being in an open state in response to the lack of fluid flow through the aspiration shut-off channel 270, thereby allowing fluid communication between the aspiration source 14 and the aspiration flow path 46. In contrast, when the passive pressure oscillation assembly 244 is operating in the oscillatory mode, the fluid-actuated valve 274 is configured for being in a closed state in response to the presence of fluid flow through the aspiration shut-off channel 270, thereby preventing fluid communication between the aspiration source 14 and the aspiration flow path 46. In this manner, the high-frequency pulses generated by the fluid resonator 276 in the aspiration flow path 46 are not absorbed by the aspiration source 14, and instead fully propagate down the aspiration flow path 46 to the aspiration catheter 12. In the illustrated embodiment, the fluid-actuated valve 274 takes the form of a diaphragm valve, although other types of fluid actuated valves are contemplated.

Figure 14:
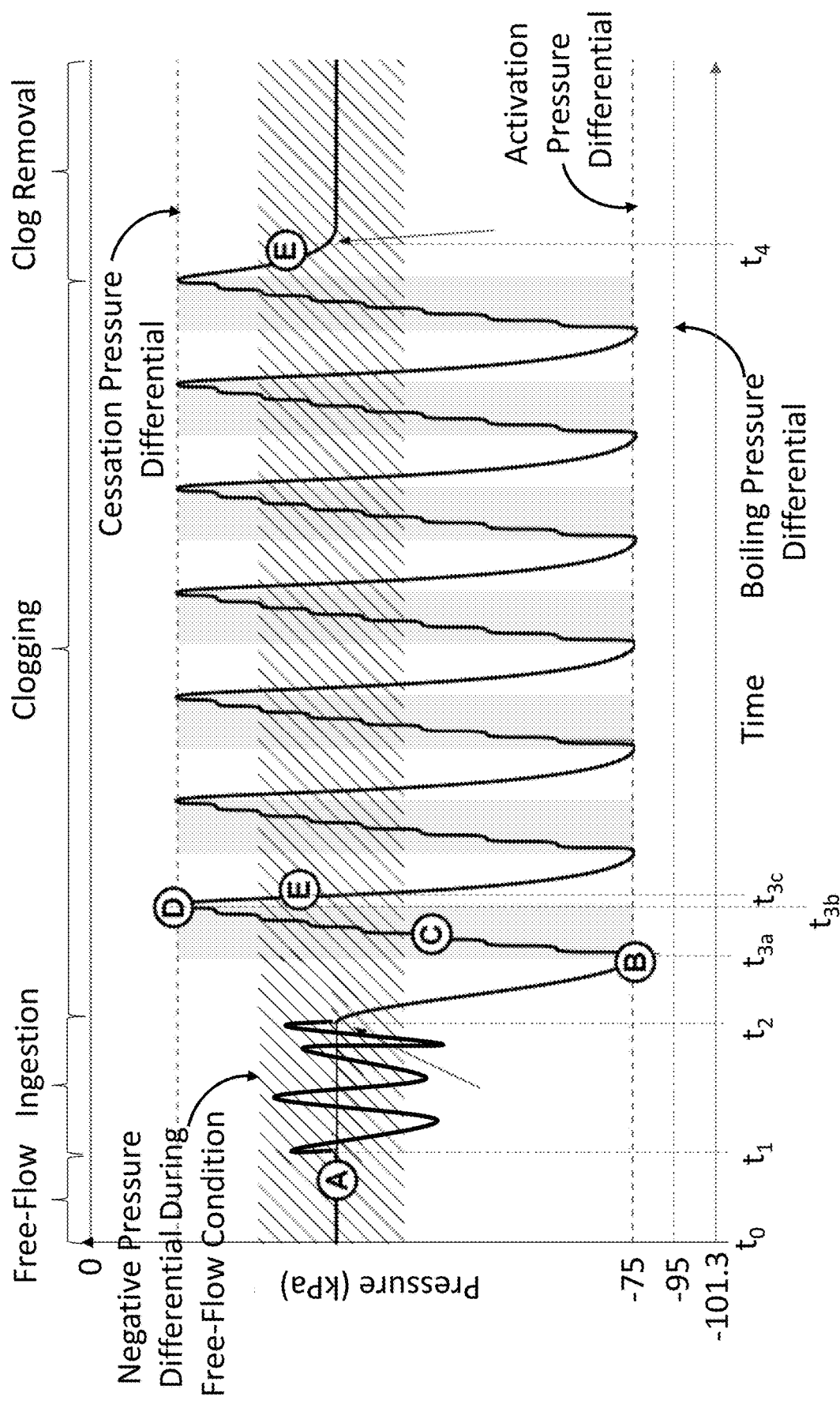
FIG. 14 is a timing diagram illustrating the negative pressure differential between a pressurized fluid source and an aspiration flow path created in the aspiration system of FIG. 1, when employing the passive pressure oscillation assembly of FIGS. 13A-13E, over time.

The plunger assembly 258 interacts with the plunger cavity 254 to switch the passive pressure oscillation assembly 244 between the normal mode and the oscillatory mode in accordance with the timing diagram illustrated in FIG. 14.

As illustrated in FIG. 14, the aspiration source 14 is first activated, such that the aspiration catheter 12 is in a free-flow condition between arbitrary time $t_0$ and $t_1$, and the negative pressure differential between the absolute pressure in the aspiration flow path 46 and the external ambient pressure experienced by the aspiration catheter 12 (in this case, the negative pressure differential between the pressurized fluid source 16 and the aspiration flow path 46) is at a free-flow negative pressure differential where the aspiration catheter 12 is only ingesting blood. During this time, the passive pressure oscillation assembly 244 remains in the normal mode. In this manner, the aspiration efficiency of the system 10 is maximized during free-flow conditions.

Between arbitrary time $t_1$ and arbitrary time $t_2$, the thrombus 2 is actively being ingested into the distal end 30 of the aspiration catheter 12, such that the negative pressure differential between the absolute pressure in the aspiration flow path 46 and the external ambient pressure experienced by the aspiration catheter 12 drops below the free-flow negative pressure differential, but not below the negative activation pressure differential of the passive pressure oscillation assembly 244, which is designed for a no-flow or low-flow condition indicative of a clogged aspiration catheter 12 or flow anomaly in the aspiration conduit of the system 10. During arbitrary time $t_0$ and time $t_2$, the passive pressure oscillation assembly 44 remains in the normal mode.

Figure 13A:
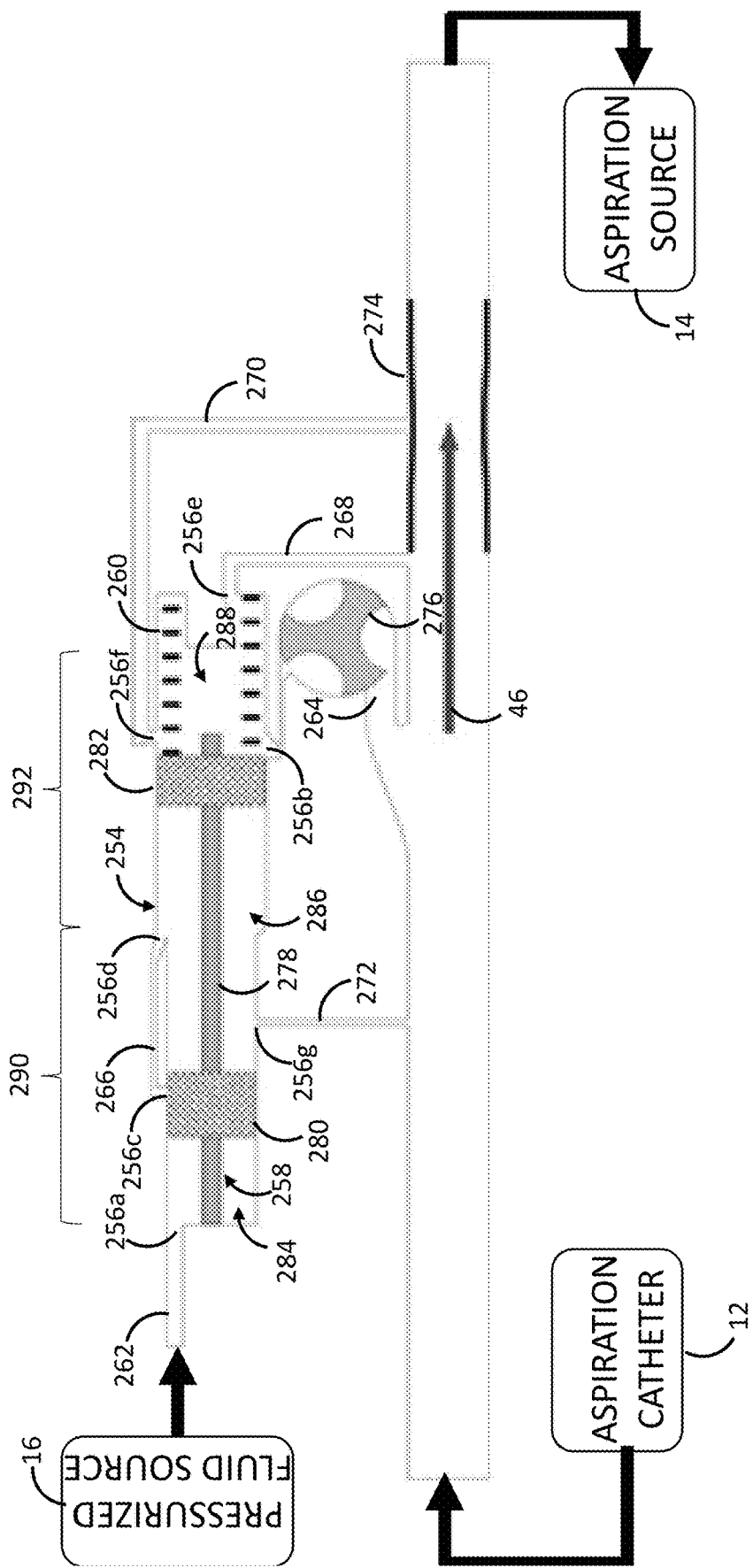
FIG. 13A is a plan view of still another embodiment of a passive pressure oscillation assembly used in the aspiration system of FIG. 1, particularly showing the passive pressure oscillation assembly in a first state.

The state of passive pressure oscillation assembly 244 illustrated in FIG. 13A during free-flow and ingestion (normal mode) corresponds to "State A" in the timing diagram of FIG. 14. As illustrated in FIG. 13A, in the absence of sufficient fluid pressure from the inlet channel 262 (via the inlet port 256a of the plunger cavity 254) on the first plunger head 280 of the plunger assembly 258, the spring 260 is configured for applying a biasing force to the plunger assembly 258 that maintains the first plunger head 280 and second plunger head 282 in closed positions within the plunger cavity 254.

In its closed position, the first plunger head 280 prevents fluid communication between the front plunger cavity region 284 and the center plunger cavity region 286 via the bypass channel 266, thereby preventing the flow of fluid from the pressurized fluid source 16, through the inlet channel 262, through the bypass channel 266, and into the center plunger cavity region 286. In its closed position, the first plunger head 280 also allows fluid communication between the flow aspiration path 46 and the center plunger cavity region 286 via the pressure equalization channel 272, thereby allowing the flow of fluid from the flow aspiration path 46 into the center plunger cavity region 286 to equalize the pressures of the flow aspiration path 46 and the center plunger cavity region 286. In this manner, the passive pressure oscillation assembly 244 may be reset at the beginning of each oscillation cycle.

In its closed position, the second plunger head 282 prevents fluid communication between the center plunger cavity region 286 and the aspiration flow path 46 via the outlet channel 264, thereby preventing the flow of fluid from the center plunger cavity region 286, through the outlet channel 264, and into the aspiration flow path 46. In its closed position, the second plunger head 282 also prevents fluid communication between the center plunger cavity region 286 and the fluid-actuated valve 274 via the aspiration shut-off channel 270, thereby preventing the flow of fluid from the plunger cavity 254 and through the aspiration shut-off channel 270, and allows fluid communication between the rear plunger cavity region 288 and the fluid-actuated valve 274 via the aspiration shut-off channel 270, thereby allowing the venting or backflow of fluid from the fluid-actuated valve 274. As such, the fluid-actuated valve 274 disposed in the aspiration flow path 46 will be switched to and maintained in its open state to, in turn, maintain fluid communication between the aspiration source 14 and the aspiration flow path 46.

Between arbitrary time $t_1$ and arbitrary time $t_2$, the thrombus 2 is actively being ingested into the distal end 30 of the aspiration catheter 12, such that the negative pressure differential between the absolute pressure in the aspiration flow path 46 and the external ambient pressure experienced by the aspiration catheter 12 drops below the free-flow negative pressure differential, but not below the negative activation pressure differential of the passive pressure oscillation assembly 244, which is designed for a no-flow or low-flow condition indicative of a clogged aspiration catheter 12 or flow anomaly in the aspiration conduit of the system 10. During arbitrary time $t_0$ and time $t_2$, the passive pressure oscillation assembly 44 remains in the normal mode, since the fluid pressure applied from the inlet channel 262 on the first plunger head 280 of the plunger assembly 258 is not sufficient enough to actively oppose the biasing force applied to the plunger assembly 258 by the spring 260 in a manner that displaces the first plunger head 280 and the second plunger head 282 from their closed positions.

At arbitrary time $t_2$, however, the aspiration catheter 12 becomes clogged with the thrombus 2, resulting in a precipitous decrease in the negative pressure differential between the absolute pressure in the aspiration flow path 46 and the external ambient pressure experienced by the aspiration catheter 12 to a level below the negative activation pressure differential, which in the illustrated case, is at −75 kPa. Thus, at or just after the arbitrary time $t_2$, the clogged aspiration catheter 12 (no-flow or low-flow condition) triggers the passive pressure oscillation assembly 244 to switch from the normal mode to the oscillatory mode, resulting in both low frequency pressure oscillations and high frequency pressure oscillations in the aspiration flow path 46 that cause pressure pulses to propagate down the aspiration conduit 24 of the aspiration catheter 12, thereby facilitating clearance of the clogged thrombus 2 at the distal end 24 of the aspiration catheter 12 at the arbitrary time $t_4$.

In particular, at arbitrary time $t_{3a}$, the negative pressure differential between the absolute pressure in the aspiration flow path 46 and the external ambient pressure experienced by the aspiration catheter 12 reaches a level below the negative activation pressure differential.

As illustrated in FIGS. 13B and 13C, during the first stage of the operation of the passive pressure oscillation assembly 244 in the oscillatory mode, and in the presence of sufficient fluid pressure from the inlet channel 262 (via the inlet port 256a of the plunger cavity 254) on the first plunger head 280 of the plunger assembly 258, the biasing force applied by the spring 260 to the plunger assembly 258 is overcome to displace the first plunger head 280 and second plunger head 282 from closed positions to open positions within the plunger cavity 254.

In its open position, the first plunger head 280 allows fluid communication between the front plunger cavity region 284 and the center plunger cavity region 286 via the bypass channel 266, thereby allowing the flow of fluid from the pressurized fluid source 16, through the inlet channel 262, through the bypass channel 266, and into the center plunger cavity region 286. In its open position, the first plunger head 280 also prevents fluid communication between the flow aspiration path 46 and the center plunger cavity region 286 via the pressure equalization channel 272, thereby preventing a continuous flow of fluid into the flow aspiration path 46 from the center plunger cavity region 286 via the pressure equalization channel 272.

In its open position, the second plunger head 282 allows fluid communication between the center plunger cavity region 286 and the aspiration flow path 46 via the outlet channel 264, thereby allowing the flow of fluid from the center plunger cavity region 286, through the outlet channel 264, and into the aspiration flow path 46, and activating the fluid resonator 276. In its open position, the second plunger head 282 also allows fluid communication between the center plunger cavity region 286 and the fluid-actuated valve 274 via the aspiration shut-off channel 270, thereby allowing the flow of fluid from the plunger cavity 254 and through the aspiration shut-off channel 270. In its open position, the second plunger head 282 also preventing fluid communication between the rear plunger cavity region 288 and the fluid-actuated valve 274 via the aspiration shut-off channel 270, thereby preventing the venting or backflow of fluid from the aspiration shut-off valve 270 into the rear plunger cavity region 288. As such, the fluid-actuated valve 274 disposed in the aspiration flow path 46 will be switched to and maintained in its closed state to, in turn, preventing fluid communication between the aspiration source 14 and the aspiration flow path 46.

In this embodiment, the first plunger head 280 and the second plunger head 280 are displaced into their open positions in a two-step process.

In particular, as illustrated in FIG. 13B, the fluid originating from the pressurized fluid source 16 applies pressure to the first plunger head 280, thereby displacing it from its closed position to its open position, and allowing fluid communication between the front plunger cavity region 284 and the center plunger cavity region 286 via the bypass channel 266. As a result, fluid flows from the pressurized fluid source 16, through the inlet channel 262, into the front plunger cavity region 284, through the bypass channel 266, and into the center plunger cavity region 286. The state of the passive pressure oscillation assembly 244 illustrated in FIG. 13B corresponds to "State B" in the timing diagram of FIG. 14. The flow of fluid into the center plunger cavity region 286 applies additional force to the second plunger head 280, and thus, the spring 260, thereby displacing the second plunger head 280 further from its closed position to its fully open position (FIG. 13C), and allowing fluid communication between the center plunger cavity region 286 and the aspiration flow path 46 via the outlet channel 264, and the center plunger cavity region 286 and the fluid-actuated valve 274 via the aspiration shut-off channel 270. As a result, fluid flows from the center plunger cavity region 286, through the outlet channel 264, and into the aspiration flow path 46, and from the center plunger cavity region 286, and through the aspiration shut-off channel 270, to place the fluid actuated valve 274 in its closed state. The state of the passive pressure oscillation assembly 244 illustrated in FIG. 13C corresponds to "State C" in the timing diagram of FIG. 14. It should be appreciated that, although the pressure between the front plunger cavity region 284 and the center plunger cavity region 286 becomes the same at State B (i.e., equalizes between State A and State B), because the surface area of the second plunger head 280 is greater than the surface area of the first plunger head 280, the force applied to the second plunger head 280 by the fluid in the center plunger cavity region 286 is greater than the force applied to the first plunger head 280 by the fluid in the front plunger cavity region 284. As a result, an additional net force is applied to the plunger assembly 258, and thus the spring 260, thereby "kicking" the second plunger head 280 from its closed position to its open position.

As can be seen from FIG. 14, between arbitrary time $t_{3a}$ and arbitrary time $t_{3b}$, the flow of fluid into the aspiration flow path 46 causes a gradual increase in the negative pressure differential between the absolute pressure in the aspiration flow path 46 and the external ambient pressure experienced by the aspiration catheter 12 to a level greater than the negative cessation pressure differential, which in the illustrated case, is at −10 kPa, which completes the first stage of the operation of the passive pressure oscillation assembly 244 in the oscillatory mode. Between arbitrary time $t_{3a}$ and arbitrary time $t_{3b}$, the negative pressure differential between the absolute pressure in the aspiration flow path 46 and the external ambient pressure experienced by the aspiration catheter 12 is also pulsed at a low amplitude, but high frequency, via operation of the fluid resonator 276.

As illustrated in FIGS. 13D and 13E, during the second stage of the operation of the passive pressure oscillation assembly 244 in the oscillatory mode, and in the presence of sufficient fluid pressure from the pressure tap channel 268 (via the pressure tap port 256e of the plunger cavity 254) on the second plunger head 282 of the plunger assembly 258, the biasing force applied by the spring 260 to the plunger assembly 258 is supplemented to displace the first plunger head 280 and second plunger head 282 from open positions back to closed positions within the plunger cavity 254. Notably, the pressure tap channel 268 is the main differential pressure tap (or sensing line), and is critical to the functioning of the passive pressure oscillation assembly 244. For any given negative pressure differential between the absolute pressure in the aspiration flow path 46 and the external ambient pressure experienced by the aspiration catheter 12, the net force on the plunger assembly 258 when the second plunger head 282 is in its open state, and thus the spring 260, is between the center plunger cavity region 286 and the rear plunger cavity region 288 due to the larger surface area of the second plunger head 282 relative to the surface area of the first plunger head 280. When the second plunger head 282 is in its closed state, the net force on the plunger assembly 258 is between the front plunger cavity region 284 and the rear plunger cavity region 288 and is less due to the smaller surface area of the first plunger head 280 relative to the surface area of the second plunger head 280.

In its closed position, the second plunger head 282 also prevents fluid communication between the center plunger cavity region 286 and the fluid-actuated valve 274 via the aspiration shut-off channel 270, thereby ceasing the flow of fluid from the plunger cavity 254 and through the aspiration shut-off channel 270 (FIG. 13D). As such, the fluid-actuated valve 274 disposed in the aspiration flow path 46 will be switched back in its closed state to, in turn, reinitiate fluid communication between the aspiration source 14 and the aspiration flow path 46. The state of the passive pressure oscillation assembly 244 illustrated in FIG. 13D corresponds to "State D" in the timing diagram of FIG. 14. In its closed position, the second plunger head 282 also prevents fluid communication between the center plunger cavity region 286 and the aspiration flow path 46 via the outlet channel 264, thereby ceasing the flow of fluid from the center plunger cavity region 286, through the outlet channel 264, and into the aspiration flow path 46 (FIG. 13E). In its closed position, the second plunger head 282 also allows fluid communication between the rear plunger cavity region 288 and the aspiration shut-off channel 270, thereby allowing the venting or backflow of fluid from the fluid-actuated valve 274 into the rear plunger cavity region 288. As a result, the fluid-actuated valve 274 will be switched back in its closed state to, in turn, reinitiate fluid communication between the aspiration source 14 and the aspiration flow path 46.

In its closed position, the first plunger head 280 prevents fluid communication between the front plunger cavity region 284 and the center plunger cavity region 286 via the bypass channel 266, thereby ceasing the flow of fluid from the pressurized fluid source 16, through the inlet channel 262, through the bypass channel 266, and into the center plunger cavity region 286 (FIG. 13E). In its closed position, the first plunger head 280 also allows fluid communication between the flow aspiration path 46 and the center plunger cavity region 286 via the pressure equalization channel 272, thereby allowing the flow of fluid into the flow aspiration path 46 from the center plunger cavity region 286 to equalize the pressures of the flow aspiration path 46 and the center plunger cavity region 286 (FIG. 13E). The state of the passive pressure oscillation assembly 244 illustrated in FIG. 13E corresponds to "State E" in the timing diagram of FIG. 14.

Notably, to ensure that the first plunger head 280 and the second plunger head 282 remain in open positions until the negative pressure differential between the absolute pressure in the aspiration flow path 46 and the external ambient pressure experienced by the aspiration catheter 12 reaches the negative cessation pressure differential at arbitrary time $t_{3b}$, the increased diameter of the second plunger head 282 relative to the diameter of the first plunger head 280 increases the pressure applied to the second plunger head 282 by the fluid in the pressure tap channel 268 required to displace the plunger assembly 258 in a manner that displaces the first plunger head 280 and the second plunger head 280 back into the closed positions.

Between arbitrary time $t_{3b}$ and arbitrary time $t_{3c}$, the negative pressure differential between the absolute pressure in the aspiration flow path 46 and the external ambient pressure experienced by the aspiration catheter 12 precipitously decreases. If the thrombus 2 in the aspiration catheter 12 has not been cleared at time $t_{3c}$, the negative pressure differential between the absolute pressure in the aspiration flow path 46 and the external ambient pressure experienced by the aspiration catheter 12 continues to precipitously decrease to a level below the negative activation pressure differential at arbitrary time tad, and the first and second stages of the operation of the passive pressure oscillation assembly 244 in the oscillatory mode is repeated. If the thrombus 2 in the aspiration catheter 12 has been cleared at time $t_{3c}$, the cleared aspiration catheter 12 (free-flow condition) triggers the passive pressure oscillation assembly 244 to switch from the oscillatory mode to the normal mode, ceasing pressure oscillations in the aspiration flow path 46, and thus ceasing pressure pulses from propagating down the aspiration conduit 24 of the aspiration catheter 12, shown at arbitrary time $t_4$.

Although particular embodiments have been shown and described herein, it will be understood by those skilled in the art that they are not intended to limit the disclosed inventions, and it will be obvious to those skilled in the art that various changes, permutations, and modifications may be made (e.g., the dimensions of various parts, combinations of parts) without departing from the scope of the disclosed inventions, which is to be defined only by the following claims and their equivalents. The specification and drawings are, accordingly, to be regarded in an illustrative rather than restrictive sense. The various embodiments shown and described herein are intended to cover alternatives, modifications, and equivalents of the disclosed inventions, which may be included within the scope of the appended claims.

What is claimed is:

1. A manifold for use with an aspiration catheter, an aspiration source, and a pressurized fluid source, the manifold comprising:
   an aspiration outlet configured for being fluidly coupled the aspiration source;
   an aspiration inlet configured for being fluidly coupled to the aspiration catheter, such that an aspiration flow path is formed between the aspiration catheter and the aspiration source;
   a relief inlet configured for being fluidly coupled to the pressurized fluid source; and
   a passive pressure oscillation assembly fluidly coupled between the relief inlet and the aspiration flow path, the passive pressure oscillation assembly configured for being operated between a normal mode that prevents fluid communication between the pressurized fluid source and the aspiration flow path, and an oscillatory mode that pulses fluid communication between the pressurized fluid source and the aspiration flow path, wherein the passive pressure oscillation assembly is configured for being triggered to operate in the oscillatory mode in response to a clog in the aspiration catheter.

2. The manifold of claim 1, wherein the passive pressure oscillation assembly is configured for being triggered to switch from the oscillatory mode to the normal mode in response to removal of the clog from the aspiration catheter.

3. The manifold of claim 1, wherein the passive pressure oscillation assembly comprises:
   a pressure actuated valve configured for opening in response to the clog in the aspiration catheter, thereby allowing a flow of fluid originating from the pressurized fluid source through the pressure actuated valve; and
   a fluid resonator configured for resonating in response to the flow of fluid originating from the pressurized fluid source through the pressure actuated valve, thereby pulsing the fluid communication between the pressurized fluid source and the aspiration flow path.

4. The manifold of claim 3, wherein the pressure actuated valve and fluid resonator are mechanically coupled to each other.

5. The manifold of claim 3, wherein the pressure actuated valve and fluid resonator are mechanically decoupled from each other.

6. The manifold of claim 3, wherein the fluid resonator is configured for resonating at a first frequency in response to the flow of fluid originating from the pressurized fluid source through the pressure actuated valve, thereby pulsing the fluid communication between the pressurized fluid source and the aspiration flow path at the first frequency, wherein the pressure actuated valve further comprises another fluid resonator configured for resonating at a second frequency different from the first frequency in response to the flow of fluid originating from the pressurized fluid source through the pressure actuated valve, thereby pulsing the fluid communication between the pressurized fluid source and the aspiration flow path at the second frequency.

7. The manifold of claim 1, wherein the passive pressure oscillation assembly comprises:
   a valve seal fluidly coupled to the relief inlet;
   a movable valve element;
   an enlarged flow cavity fluidly coupled to the aspiration flow path, the enlarged flow cavity having a diameter that is larger than a diameter of the movable valve element; and
   a spring configured for applying a biasing force to the movable valve element to maintain the movable valve element in a closed position against the valve seal to prevent the flow of the fluid originating from the pressurized fluid source into the enlarged flow cavity, wherein the movable valve element is configured for, in response to the clog in the aspiration catheter that causes the fluid originating from the pressurized fluid source to apply an opposing force to the movable valve element that overcomes the biasing force applied by the spring to the movable valve element, being displaced from the closed position to an open position away from the valve seal and into the enlarged flow cavity to allow the flow of the fluid originating from the pressurized fluid source, through the valve seal, through the enlarged flow cavity, and into the aspiration flow path;

wherein the biasing force applied by the spring to the movable valve element, the opposing force applied by the fluid originating from the pressurized fluid source, and the mass of the movable valve element are selected, such that the movable valve element oscillates between the closed position and the open position.

8. The manifold of claim 7, wherein the movable valve element comprises one of a disk and a ball, and the valve seal comprises a valve seat.

9. The manifold of claim 7, wherein the movable valve element comprises a disk, and the valve seal comprises a valve cylinder.

10. The manifold of claim 7, wherein the passive pressure oscillation assembly further comprises:
a plunger cavity disposed between the valve seal and the relief inlet;
a plunger head slidably disposed within the plunger cavity, the plunger head having a channel extending through the plunger head, such that the valve seal is fluidly coupled to the relief inlet to equalize pressure between the pressurized fluid source and the plunger cavity;
another spring configured for applying a biasing force to the plunger head to maintain the movable valve element away from the stop;
wherein the fluid originating from the pressurized fluid source that applies the opposing force to the movable valve element in response to the clog in the aspiration catheter resides within the plunger cavity; and
wherein the flow of the fluid from the plunger cavity, through the valve seal, through the enlarged flow cavity, and into the aspiration flow path, causes fluid from the pressurized fluid source to apply an opposing force to the plunger that overcomes biasing force applied by the other spring to the plunger, such that the plunger head is displaced within the plunger cavity until the plunger abuts the stopper, thereby preventing flow of the fluid from the plunger cavity, through the valve seal, through the enlarged flow cavity, and into the aspiration flow path, and allowing the biasing force applied by the spring to the movable valve element to displace the movable valve element from the open position back to the closed position.

11. The manifold of claim 10, wherein the passive pressure oscillation assembly further comprises a reduced profile center cavity fluidly coupled between the valve seal and the plunger cavity, wherein the plunger stop is formed by a wall of the plunger cavity adjacent the reduced profile center cavity.

12. The manifold of claim 1, wherein the oscillatory mode of the passive pressure oscillation assembly pulses fluid communication between the pressurized fluid source and the aspiration flow path at a frequency in the range of 0.2 Hz-10 Hz.

13. The manifold of claim 1, wherein the oscillatory mode of the passive pressure oscillation assembly pulses fluid communication between the pressurized fluid source and the aspiration flow path concurrently at a first frequency and at second frequency different from the first frequency.

14. The manifold of claim 13, wherein the first frequency is in the range of 0.2 Hz-10 Hz, and the second frequency is in the range of 100 Hz-400 Hz.

15. The manifold of claim 1, wherein the passive pressure oscillation assembly comprises:
a plunger cavity;
a plunger assembly slidably disposed within the plunger cavity, the plunger assembly including a rod, a first plunger head affixed to the rod, and a second plunger head affixed to the rod in a spaced apart relationship with the first plunger head, thereby forming a front plunger cavity region, a center plunger cavity region between the first plunger head and the second plunger head, and a rear plunger cavity region;
an inlet channel in fluid communication between the relief inlet and the front plunger cavity region;
an outlet channel conditionally in fluid communication between the center plunger cavity region and the flow aspiration path;
a bypass channel conditionally in fluid communication between the front plunger cavity region and the center plunger cavity region;
a pressure tap channel in fluid communication between the flow aspiration path and the rear plunger cavity region;
a spring configured for applying a biasing force to the plunger assembly during operation of the passive pressure oscillation assembly in the normal mode that maintains the first plunger head in a closed position within the plunger cavity, thereby preventing fluid communication between the front plunger cavity region and the center plunger cavity region via the bypass channel, and maintains the second plunger head in a closed position within the plunger cavity, thereby preventing fluid communication between the center plunger cavity region and the aspiration flow path via the outlet channel;
wherein the plunger assembly is configured for, during operation of the passive pressure oscillation assembly in the oscillatory mode,
in response to pressure applied by fluid originating from the pressurized fluid source to the plunger assembly via the input channel, overcoming the biasing force applied by the spring to the plunger assembly to displace the first plunger head from the closed position to an open position within the plunger cavity, thereby allowing fluid communication between the front plunger cavity region and the center plunger cavity region via the bypass channel, and further to displace the second plunger head from the closed position to an open position within the plunger cavity, thereby allowing fluid communication between the center plunger cavity region and the aspiration flow path; and
in response to pressure applied by fluid originating from the aspiration flow path to the plunger assembly via the pressure tap channel, supplementing the biasing force applied by the spring to the plunger assembly to displace the second plunger head from the open position back to the closed position, and then the first plunger head from the open position back to the closed position;
whereby the oscillatory mode pulses fluid communication between the pressurized fluid source and the aspiration flow path at a first frequency.

16. The manifold of claim 15, further comprising:
a fluid-actuated valve disposed within the aspiration flow path; and
an aspiration shutoff channel conditionally in fluid communication between the center plunger cavity region and the fluid-actuated valve;
wherein the second plunger head, when in the closed position, is configured for preventing fluid communication between the center plunger cavity region and the fluid-actuated valve via the aspiration shutoff channel, and allowing fluid communication between the rear plunger cavity region and the fluid-actuated valve via the aspiration shutoff channel, and when in the open position, is configured for allowing fluid communication between the center plunger cavity region and the fluid-actuated valve via the aspiration shutoff channel, and preventing fluid communication between the rear plunger cavity region and the fluid-actuated valve via the aspiration shutoff channel.

17. The manifold of claim 16, wherein the fluid-actuated valve is a diaphragm valve.

18. The manifold of claim 15, further comprising a pressure equalization channel conditionally in fluid communication between the flow aspiration path and the center plunger cavity region, wherein the first plunger head, when in the closed position, is configured for allowing fluid communication between the flow aspiration path and the center plunger cavity region, and when in the open position, is configured for preventing fluid communication between the flow aspiration path and the center plunger cavity region.

19. The manifold of claim 15, further comprising a resonator disposed in the outlet channel, whereby the oscillatory mode further pulses fluid communication between the pressurized fluid source and the aspiration flow path at a second frequency concurrently with and different from the first frequency.

20. The manifold of claim 19, wherein the resonator is a paddle wheel.

21. The manifold of claim 15, wherein the plunger cavity has a first portion having a diameter, and a second portion having a diameter greater than the diameter of the first portion, the first plunger head has a diameter, and the second plunger head has a diameter greater than the diameter of the first plunger head, wherein the first plunger head is configured for being displaced within the first portion, and the second plunger head is configured for being displaced within the second portion.

22. An aspiration system, comprising:
the manifold of claim 1;
the aspiration source coupled to the aspiration outlet;
the aspiration catheter coupled to the aspiration inlet having a distal end sized and dimensioned to reach an occlusion within a remote location of a vasculature of a patient; and
the pressurized fluid source coupled to the relief inlet.

23. The manifold of claim 1, wherein the oscillatory mode pulses fluid communication between the pressurized fluid source and the aspiration flow path at an amplitude and frequency that facilitates ingestion of a clog in the aspiration catheter.

24. The manifold of claim 1, wherein the passive pressure oscillation assembly is configured for being triggered to switch from the normal mode to the oscillatory mode in response to a clog in the aspiration catheter.

25. The manifold of claim 1, wherein the oscillatory mode is a second oscillatory mode, and wherein the passive pressure oscillation assembly is configured for being triggered to switch from the normal mode to a first oscillatory mode in response to active ingestion of an occlusion, and configured for being triggered to switch from the first oscillatory mode to the second oscillatory mode in response to a clog in the aspiration catheter.

26. The manifold of claim 25, wherein the first oscillatory mode has a relatively high frequency and relatively low amplitude, and wherein the second oscillatory mode has a relatively low frequency and relatively high amplitude.

\* \* \* \* \*